(12) United States Patent
Sheffer et al.

(10) Patent No.: US 10,375,896 B2
(45) Date of Patent: Aug. 13, 2019

(54) POLE HEDGE TRIMMER

(71) Applicant: Black & Decker Inc., New Britain, CT (US)

(72) Inventors: Joshua Sheffer, Dover, PA (US); Mark Miller, Fawn Grove, PA (US); Jason Busschaert, Bel Air, MD (US)

(73) Assignee: Black & Decker, Inc., New Britain, CT (US)

( * ) Notice: Subject to any disclaimer, the term of this patent is extended or adjusted under 35 U.S.C. 154(b) by 114 days.

(21) Appl. No.: 15/491,185

(22) Filed: Apr. 19, 2017

(65) Prior Publication Data

US 2017/0303474 A1    Oct. 26, 2017

Related U.S. Application Data

(60) Provisional application No. 62/325,984, filed on Apr. 21, 2016.

(51) Int. Cl.
*A01G 3/053* (2006.01)
*B25G 1/04* (2006.01)

(52) U.S. Cl.
CPC .............. *A01G 3/053* (2013.01); *B25G 1/04* (2013.01)

(58) Field of Classification Search
CPC .................................. A01G 3/053; B25G 1/04
USPC ..................................... 30/272.1, 275.4, 203
See application file for complete search history.

(56) References Cited

U.S. PATENT DOCUMENTS

| 1,937,586 | A |   | 12/1933 | Ortt |
| 2,703,928 | A |   | 3/1955 | Southwick |
| 2,750,666 | A |   | 6/1956 | Teagle |
| 3,343,613 | A |   | 9/1967 | Carnesecca, Jr. et al. |
| 4,207,675 | A |   | 6/1980 | Causey et al. |
| 4,318,228 | A |   | 3/1982 | Kimura |
| 4,341,017 | A | * | 7/1982 | Janczak .................. A01G 3/08 30/296.1 |
| 4,359,822 | A |   | 11/1982 | Kolodziejczyk |

(Continued)

FOREIGN PATENT DOCUMENTS

| AU | 1513388 A | 2/1989 |
| EP | 0879553 A2 | 11/1998 |

(Continued)

OTHER PUBLICATIONS

Extended European Search Report, EP Application No. 17167401.3-1655/3235369, EPO (dated Nov. 24, 2017).

(Continued)

*Primary Examiner* — Omar Flores Sanchez
(74) *Attorney, Agent, or Firm* — John Yun

(57) ABSTRACT

A pole hedge trimmer which is balanced about a pole axis and which has a handle which can be operated with a single hand to orient the trimming blade at a desired trimming angle. A pole hedge trimmer having a trimmer assembly having a motor unit and a trimmer unit, in which the trimmer assembly is supported by a pole at a distance from a power unit and the motor unit and trimmer unit are generally in balance with one another about a pole axis. The pole hedge trimmer can have a position system for orienting a trimmer blade using an orientation handle configured for one-handed operation by an operator to position the trimmer blade. The pole hedge trimmer can be a low-profile hedge trimmer allowing for very close trimming to surfaces.

19 Claims, 26 Drawing Sheets

(56) References Cited

U.S. PATENT DOCUMENTS

| | | | |
|---|---|---|---|
| 4,651,420 A | 3/1987 | Lonnecker | |
| 4,653,142 A | 3/1987 | Upton | |
| 4,760,646 A | 8/1988 | Siegler | |
| 4,916,818 A | 4/1990 | Panek | |
| 5,261,162 A | 11/1993 | Siegler | |
| 6,182,367 B1 | 2/2001 | Janczak | |
| 6,192,769 B1 | 2/2001 | Stark et al. | |
| 6,260,278 B1 | 7/2001 | Faher | |
| 6,488,511 B1 | 12/2002 | Stewart | |
| 6,651,347 B2 | 11/2003 | Uhl | |
| 7,152,328 B2 * | 12/2006 | Champlin | A01G 3/08 30/381 |
| 7,162,804 B2 | 1/2007 | Matsuura | |
| D596,000 S | 7/2009 | Klingbeil | |
| 7,743,683 B2 | 6/2010 | Dayton et al. | |
| 7,992,308 B1 | 8/2011 | Fisher | |
| 8,186,066 B2 | 5/2012 | Doragrip et al. | |
| 8,539,678 B2 | 9/2013 | Dahlberg et al. | |
| 8,793,886 B2 | 8/2014 | Yamaoka et al. | |
| 9,032,630 B2 | 5/2015 | Brown et al. | |
| 2002/0194739 A1 | 12/2002 | Krane et al. | |
| 2003/0136003 A1 | 7/2003 | Casttelmani | |
| 2005/0241161 A1 | 11/2005 | Doragrip et al. | |
| 2007/0000138 A1 | 1/2007 | Baskar et al. | |
| 2007/0234579 A1 | 10/2007 | Patrick | |
| 2010/0037469 A1 | 2/2010 | Chubb | |
| 2010/0101096 A1 | 4/2010 | Yamaoka et al. | |
| 2010/0126029 A1 | 5/2010 | Peterson | |
| 2012/0272798 A1 | 11/2012 | Houghton | |
| 2013/0248216 A1 | 9/2013 | Tsuchiya | |
| 2016/0330914 A1 * | 11/2016 | Tang | A01G 3/053 |

FOREIGN PATENT DOCUMENTS

| | | |
|---|---|---|
| GB | 479351 | 1/1938 |
| GB | 2144018 A | 2/1985 |
| GB | 2319742 A | 3/1998 |

OTHER PUBLICATIONS

Partial European Search Report (R. 64 EPC), EP Application No. 17167401.3-1655, EPO (dated Sep. 11, 2017).

* cited by examiner

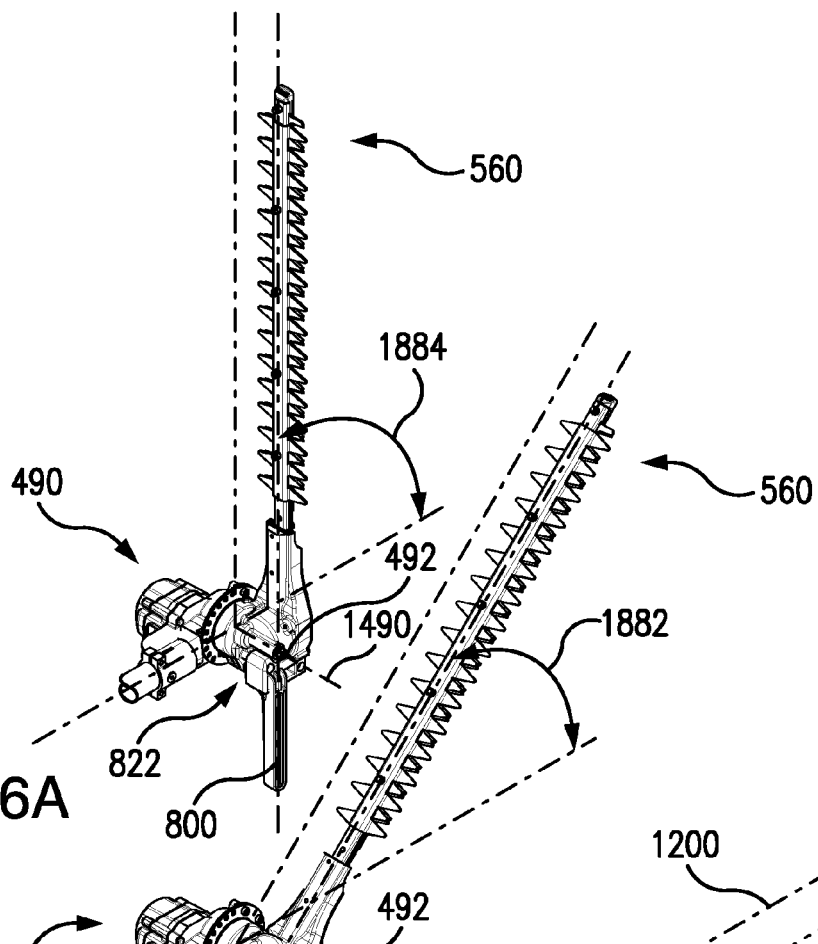
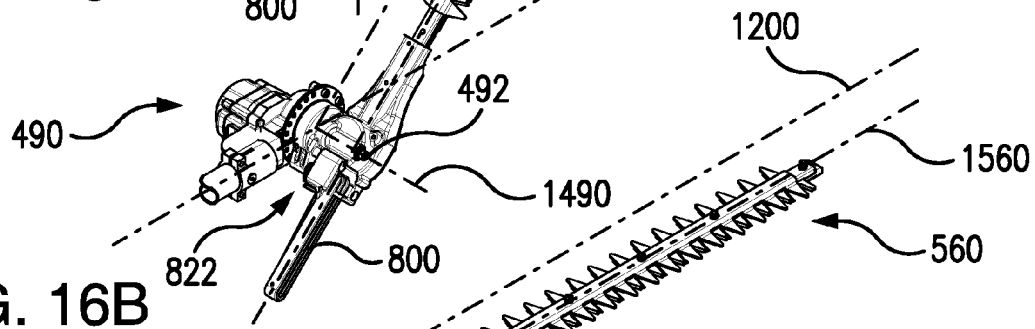
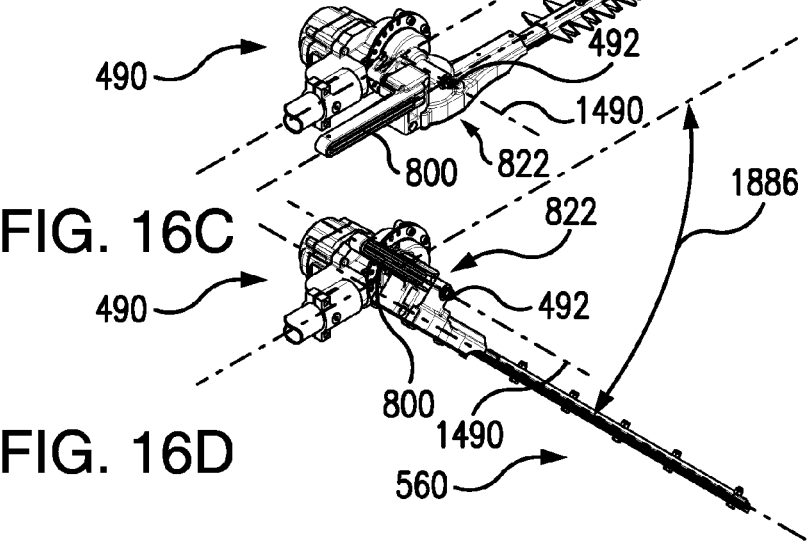
FIG. 16A
FIG. 16B
FIG. 16C
FIG. 16D

POLE HEDGE TRIMMER

CROSS-REFERENCE TO RELATED APPLICATIONS

This patent application is a non-provisional application of and claims the benefit of the filing date of copending U.S. provisional patent application No. 62/325,984 entitled "Pole Hedge Trimmer" filed Apr. 21, 2016.

INCORPORATION BY REFERENCE

This patent application incorporates by reference in its entirety copending U.S. provisional patent application No. 62/325,984 entitled "Pole Hedge Trimmer" filed Apr. 21, 2016.

FIELD OF THE INVENTION

This disclosure regards a hedge trimmer.

BACKGROUND OF THE INVENTION

Hedge trimmers which have a blade located at a distance from user, such as for trimming tall hedges or trees, are bulky, have poor weight distribution and are awkward to use. The use of such tools requires excess physical effort by an operator and the operation of such an unwieldy tool can result in erroneous trimming, or poor quality work, being executed on the flora being trimmed. A strong need exists for an improved tool for hedge trimming.

SUMMARY OF THE INVENTION

The technology disclosed herein is an ergonomically designed and well-balanced pole hedge trimmer. In an embodiment, the pole hedge trimmer can be balanced on either side of a balance plane. In another embodiment, the pole hedge trimmer can be balanced radially about a pole centerline, or other longitudinal axis. In a further example embodiment, the pole hedge trimmer can have a center of gravity distribution balanced radially about a pole centerline, a center of gravity axis, or other longitudinal axis.

In another aspect, the pole hedge trimmer can have an orientation handle which an operator can use to rotate the trimmer head to achieve a desired trimming angle. In an embodiment, an operator can use one hand to operate the orientation handle and move the trimmer head to a trimming angle. For non-limiting example, in an embodiment an operator can grip the orientation handle of a trimmer assembly when the trimmer assembly is in a locked state with one hand and with that hand can actuate an orientation handle trigger to achieve an unlocked state of the trimmer assembly. Then, with that same single hand, the operator can move the trimmer head to achieve a trimming angle of the trimmer blade. In this example embodiment, when operator can releases a tightness of the one-handed grip on the orientation handle trigger which achieves the unlocked state, the trigger can return to its locked configuration and the trimmer assembly and will also return to a locked state in which the trimmer blade has been configured to the operator's desired trimming angle.

In an embodiment, the operator can ergonomically hold a portion of the pole hedge trimmer such as the pole with one hand and can use the other hand to grip, unlock, move the handle to change the trimmer angle of the trimmer blade and re-lock the trimmer head in an efficient process to achieve a desired trimming angle of the trimmer blade. In such an embodiment, the operator can with one hand grip the handle, unlock the trimmer head, change the orientation of the trimmer head and by releasing the grip on the handle achieve a locked state of the trimmer assembly with the trimmer blade in a desired orientation.

In an embodiment a power tool can have a main body housing comprising a power unit configured at a distance from a trimmer assembly by a support member. The trimmer assembly can have a motor unit powered by the power unit and can have a trimmer unit can have a trimmer axle about which a trimmer head can have at least one of a trimmer blade can be rotated by an operator to configure the at least one trimmer blade at a desired trimmer angle. The motor unit and the trimmer unit can be generally in balance with one another about a support member axis.

The motor unit can a motor which provides power to drive at least one of the trimmer blade. The motor and the trimmer blade can be located on opposing sides of the support member axis. The motor unit can have a motor configured to be free of imparting a rotational moment to the power tool about the support member axis. The motor unit can have a motor configured to be free of imparting a torque about the support member axis. In an embodiment, the trimmer head can have a trimmer axle and the motor can be configured such that a direction of the motor torque is perpendicular to a trimmer axle centerline.

In an embodiment, the trimmer assembly can have a trimmer assembly center of gravity and the trimmer blade can have a blade tip. The center of gravity can be configured between a support member end and the blade tip when the trimmer blade is oriented in a configuration for a trimming operation.

In an embodiment, the power tool can be a pole hedge trimmer and/or hedge trimmer.

In an embodiment, a hedge trimmer can have a power unit powering a motor unit of a trimmer assembly. The trimmer assembly can have a trimmer unit that can have a trimmer head having at least one trimmer blade driven by a motor of the motor unit. The trimmer assembly can also have a position system for orienting the at least one trimmer blade to a trimmer angle. Further, the position system can have an orientation handle adapted for one-hand operation by an operator to move and lock the trimmer head. The position system can have a locked state and an unlocked state. When in the unlocked state the position system allows the at least one trimmer blade to move to an orientation can have a trimming angle, and when in the locked state the position system fixes the trimmer blade at the trimming angle. The trimmer assembly can have a trimmer head rotatably mounted on a trimmer axle and the position system can have a handle configured to selectively rotate the trimmer head about the axle by the motion of one hand of an operator when the position system is in the unlocked state.

In an embodiment, the orientation handle can have an orientation handle trigger which when triggered by a force of one hand of an operator achieves the unlocked state of the position system allowing the at least one trimmer blade to move to an orientation having a trimming angle by the motion of one hand of an operation upon the orientation handle. Optionally, the position system can have an orientation lock disk configured between the motor unit and the trimmer unit.

In an embodiment, the hedge trimmer can have a support member supporting the trimmer assembly at a distance from the power unit. The support member can have a support member axis. The motor unit and the trimmer unit can be located on opposing sides of the support member axis and can be generally in balance with one another about an axis of the support member. The motor of the motor unit can drive an eccentric which can drive at least one trimmer blade. The motor and the eccentric can be configured on opposing sides of an axis of the support member. The motor can have a rotor axis which is parallel to a trim plane of the at least one trimmer blade. In an embodiment, the hedge trimmer cam have the motor which has a rotor axis and the hedge trimmer can have the trimmer head which has the eccentric which imparts power to the at least one trimmer blade; and in which the eccentric can have an eccentric axis which is not parallel to the rotor axis. Optionally, the trimmer blade position system can have an orientation handle configured to engage and disengage an orientation lock pin with a lock opening of an orientation lock disk.

In an embodiment, the hedge trimmer can be a low-profile hedge trimmer which has a power unit configured at a distance from a trimmer assembly by a support member. the trimmer assembly can have a trimmer axle about which a trimmer head having at least one of a trimmer blade can be reversibly rotated by an operator to configure the at least one trimmer blade at a desired trimmer angle. The trimmer axle can have an axle centerline and the trimmer blade can have a lower face which can have a lower face distance from the axle centerline of 60 mm or less. In an embodiment, the low-profile hedge trimmer can have a first trimmer blade and a second trimmer blade can have a blade interface between them; and the blade interface distance from the axle centerline of 50 mm or less. The low-profile hedge trimmer can also have the trimmer blade which has a lower blade face clearance of 7.5 mm or less. In an embodiment, the support member can be a pole and the trimmer head can have a center of gravity of 20 mm or less from the pole centerline axis.

In its different embodiments, the technology herein can be used for power tools which are trimmers, such as in non-limiting example a cutting tool supported by a support member or pole, such as a hedge trimmer, a tree trimmer, or a chain saw, branch cutter, or cutting tool, in which the trimming mechanism is generally balanced against the motor unit such that the power tool is generally free of a force or torque which would cause the power tool to twist in an operators hands about a pole and/or support member centerline.

In an embodiment, the pole hedge trimmer can have a motor unit, a trimmer head which has at least one trimmer blade, and a position system for reversibly orienting at least one trimmer blade relative to a trim angle plane. The position system can have an orientation handle adapted for one-hand operation to move and reversibly lock the trimmer head. The motor unit can be configured on a motor side of a balance plane and the at least one trimmer blade configured on a trimmer side of a balance plane. The position system can have a locked state and an unlocked state. When in the unlocked state, the position system allows the at least one trimmer blade to move to an orientation having a trimming angle; and when in the locked state, the position system reversibly fixes the trimmer blade at the trimming angle.

In an embodiment, the pole hedge trimmer can have a power unit which can be adapted to power a trimmer assembly and a pole which can connect the power unit and the trimmer assembly. The pole hedge trimmer can have a balance plane between a motor side and a trimmer side. The trimmer assembly can have a motor unit configured on the motor side and the trimmer assembly can have a trimmer unit configured on the trimmer side. The pole hedge trimmer can have a motor-side weight and a trimmer-side weight which can be substantially balanced with one another.

In an embodiment, a motor-side center of gravity and a trimmer-side center of gravity can be configured to substantially balance the pole hedge trimmer between the motor side and the trimmer side of the balance plane.

The trimmer assembly can have one, or more, of a trimmer handle, and a trimmer head and a trimmer blade configured at least in part on the trimmer-side of the balance plane. The trimmer assembly can have a trimmer blade configured on the trimmer-side of the balance plane such that the trimmer blade is free of intersection with the balance plane at any trimmer angle. The trimmer assembly can have a trimmer head having an eccentric configured on the trimmer side of the balance plane.

In an embodiment, the pole hedge trimmer can have a motor which provides power to drive at least one of a trimmer blade. The motor and the trimmer blade can be located on opposing sides of a balance plane. The pole hedge trimmer can also have an eccentric which drives at least one trimmer blade. The motor and the eccentric can be configured on opposing sides of the balance plane.

In an embodiment, the motor configured such that a direction of a motor torque does not intersect the balance plane. In another embodiment, the motor can be configured such that a direction of the motor torque is parallel to the balance plane. In yet another embodiment, the motor can be configured such that a direction of the motor torque is perpendicular to a trimmer axle.

The trimmer assembly can have a trimmer head having a trimmer handle which can be used by an operator to orient the trimmer blade to achieve a trimmer angle.

The trimmer assembly can have a 1st gear reduction on the motor-side of the balance plane and a 2nd gear reduction configured on the trimmer side of the balance plane.

The pole hedge trimmer can have a trim plane free of a motor torque coplanar with the trim plane. The pole hedge trimmer can have the motor which has a rotor axis which is at an angle which is not perpendicular to the trim plane. The pole hedge trimmer can have the motor which has a rotor axis which is parallel to the trim plane.

The pole hedge trimmer has a trimmer head having an eccentric which imparts power to the at least one of a trimmer blade; the eccentric having an eccentric axis which is not parallel to the rotor axis. The pole hedge trimmer can have the motor which has a rotor axis and the pole hedge trimmer has a trimmer head having an eccentric which imparts power to the at least one of a trimmer blade. The eccentric having an eccentric axis which is perpendicular to the rotor axis.

The pole hedge trimmer can have a position system which has an actuator which can change the state of the position system reversibly from a locked state to an unlocked state. The position system can have an actuator located at least in part on the trimmer side of the balance plane, the actuator adapted to change the state of the position system reversibly from a locked state to an unlocked state. The position system can have an actuator located at least in part on the motor side of the balance plane, the actuator adapted to change the state of the position system reversibly from a locked state to an unlocked state.

The position system can have a handle having at least a portion located on the trimmer side of the balance plane which, when the position system is in an unlocked state, can move the at least one trimmer blade to a trimming angle. The position system can have a grip having at least a portion located on the trimmer side of the balance plane which, when the position system is in an unlocked state, can move the at least one trimmer blade to a trimming angle.

The position system can have a knob having at least a portion located on the trimmer side of the balance plane which, when the position system is in an unlocked state, can move the at least one trimmer blade to a trimming angle.

The position system can have a handle having at least a portion located on the motor side of the balance plane which, when the position system is in an unlocked state, can move the at least one trimmer blade to a trimming angle. The at least one trimmer blade can be moved by moving a handle which is at least in part located on the trimming side of the balance plane when the position system is in an unlocked state.

The position system can have a handle having at least a portion located on the motor side of the balance plane and at least a part on the trimmer side which, when the position system is in an unlocked state, can move the at least one trimmer blade to a trimming angle.

In an embodiment, a trimmer blade position system can have the trimmer blade position system having a means for reversibly fixing the position of a trimmer blade. The means for reversibly fixing the position configured at least in part on a motor side of the balance plane. The trimmer blade configured at least in part on a trimmer side of a balance plane. The trimmer blade position system at least in part intersects the balance plane.

The means for reversibly fixing the position of the trimmer blade can have a lock pin which can reversibly engage a lock opening. The means for reversibly fixing the position of the trimmer blade can have a lock-and-key mechanism. The means for reversibly fixing the position of the trimmer blade can have a friction lock mechanism.

The means for reversibly fixing the position of the trimmer blade can have an orientation lock pin which can reversibly engage a lock opening of an orientation lock disk. The means for reversibly fixing the position of the trimmer blade can have a handle having a trigger which can reversibly engage and disengage an orientation lock pin with a lock opening of an orientation lock disk.

The trimmer blade position system can have a trimmer axle centerline which is collinear with and intermediate shaft axis. The trimmer blade position system can have an intermediate shaft which intersects the balance plane.

The trimmer blade position system can have a safety switch at least a portion of which can be configured on the trimmer side. The trimmer blade position system can have a safety switch at least a portion of which intersects the balance plane. In an embodiment, the safety switch can have at least a portion configured on the motor side, or be configured on the motor side.

In an embodiment, the trimmer blade position system can have the trimmer blade position system and the trimmer blade configured on a trimmer side of a balance plane; and a motor unit configured on a motor side of a balance plane. In another embodiment, the trimmer blade position system can have the trimmer blade configured on a trimmer side of a balance plane; and the trimmer blade position system and a motor unit configured on a motor side of a balance plane. The trimmer blade position system can have the trimmer blade configured on a trimmer side of a balance plane; and a motor unit and at least a part of the trimmer blade position system configured on a motor side of a balance plane.

In an embodiment, the low-profile hedge trimmer can have a power unit, a trimmer assembly and a pole having a pole centerline. The low-profile hedge trimmer can have a trimmer blade position system which does not intersect the pole centerline. The low-profile hedge trimmer can be substantially balanced radially about the pole centerline. The low-profile hedge trimmer can have a motor unit which does not intersect the pole centerline and/or a trimmer unit which does not intersect the pole centerline.

In an embodiment, the low-profile hedge trimmer can have a center of gravity axis which is collinear with the pole centerline. In another embodiment, the low-profile hedge trimmer can have a center of gravity axis which is parallel the pole centerline. In yet another embodiment, the low-profile hedge trimmer can have a center of gravity axis which does not intersect the motor unit or the trimmer unit.

A pole hedge trimmer can have a trimmer head having a blade having a lower face which has a lower face distance from the axle centerline and/or centerline axis and/or center of gravity axis of 60 mm or less. A pole hedge trimmer can have a trimmer head having a blade interface at a blade interface distance from the axle centerline and/or centerline axis and/or center of gravity axis of 50 mm or less.

The trimmer head having a lower blade face clearance of 7.5 mm or less, or 5 mm or less. A pole hedge trimmer can have a trimmer head having a center of gravity of 20 mm or less, or 15 mm or less, or 10 mm or less, or 8 mm or less, from the centerline axis, or from the center of gravity axis. Optionally, the centerline axis and center of gravity axis can be the same or different.

The pole hedge trimmer can also have an operator control plane, which can be coplanar with the balance plane or different from the balance plane, free of a motor torque coplanar with the operator control plane. The operator control plane experiencing a trimmer rotational moment coplanar to the operator control plane which is less than 10 lbf. The operator control plane experiencing a trimmer rotational moment coplanar to the operator control plane which is less than 2 lbf.

BRIEF DESCRIPTION OF THE DRAWINGS

The present technology in its several aspects and embodiments solves the problems discussed above and significantly advances the technology of hedge trimmers. The present technology can become more fully understood from the detailed description and the accompanying drawings, wherein:

FIG. 16A shows the trimmer blade configured at a 90° trimmer angle;

FIG. 16B shows the trimmer blade configured at a positive 45° trimmer angle;

FIG. 16C shows the trimmer blade configured at a 0° trimmer angle in which the trimmer blade centerline coplanar with the pole centerline;

FIG. 16D shows the trimmer blade configured at a negative 45° trimmer angle;

Herein, like reference numbers in one figure refer to like reference numbers in another figure.

DETAILED DESCRIPTION OF THE INVENTION

Figure 1:
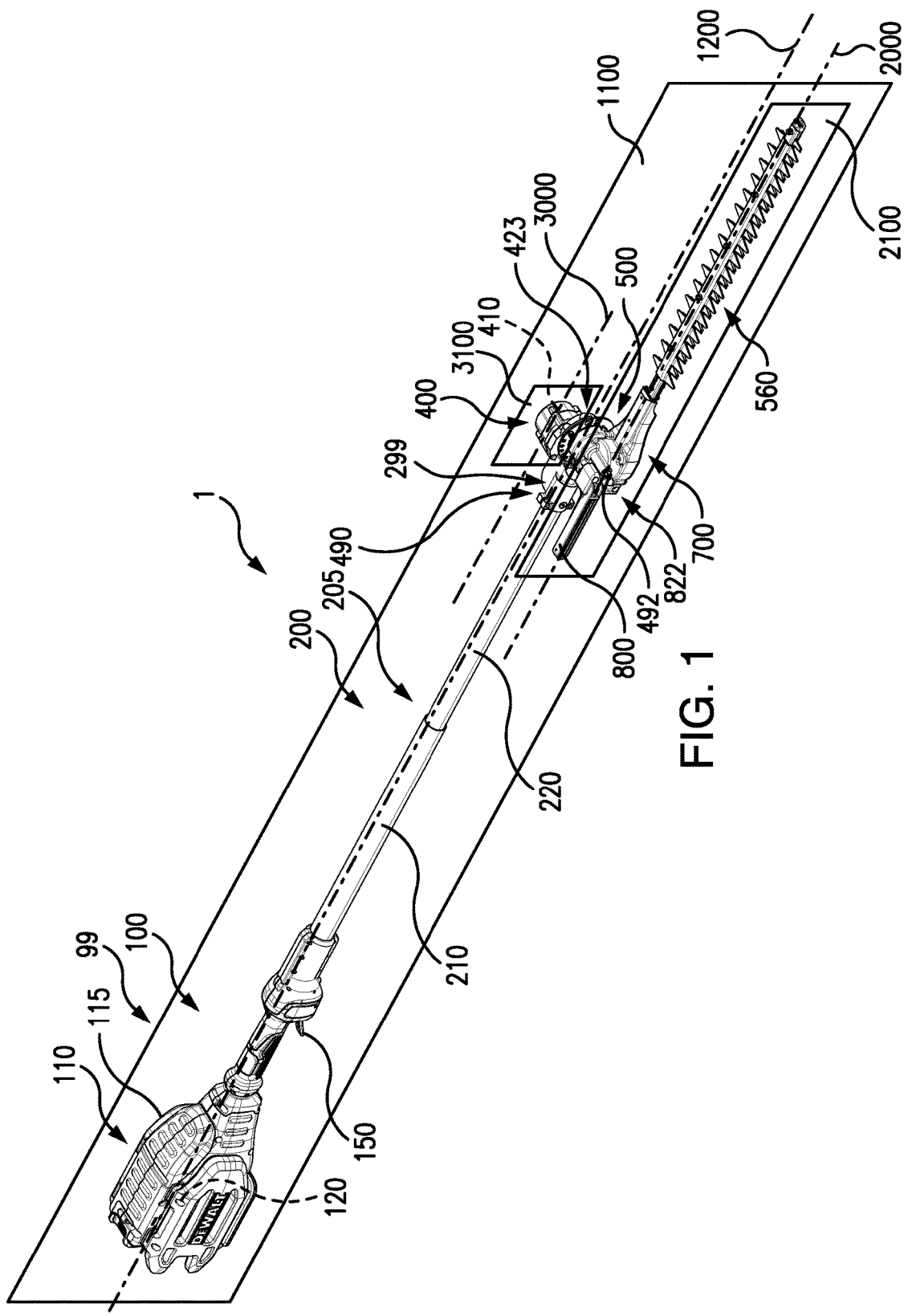
FIG. 1 is a perspective view of a pole hedge trimmer.
Figure 2:
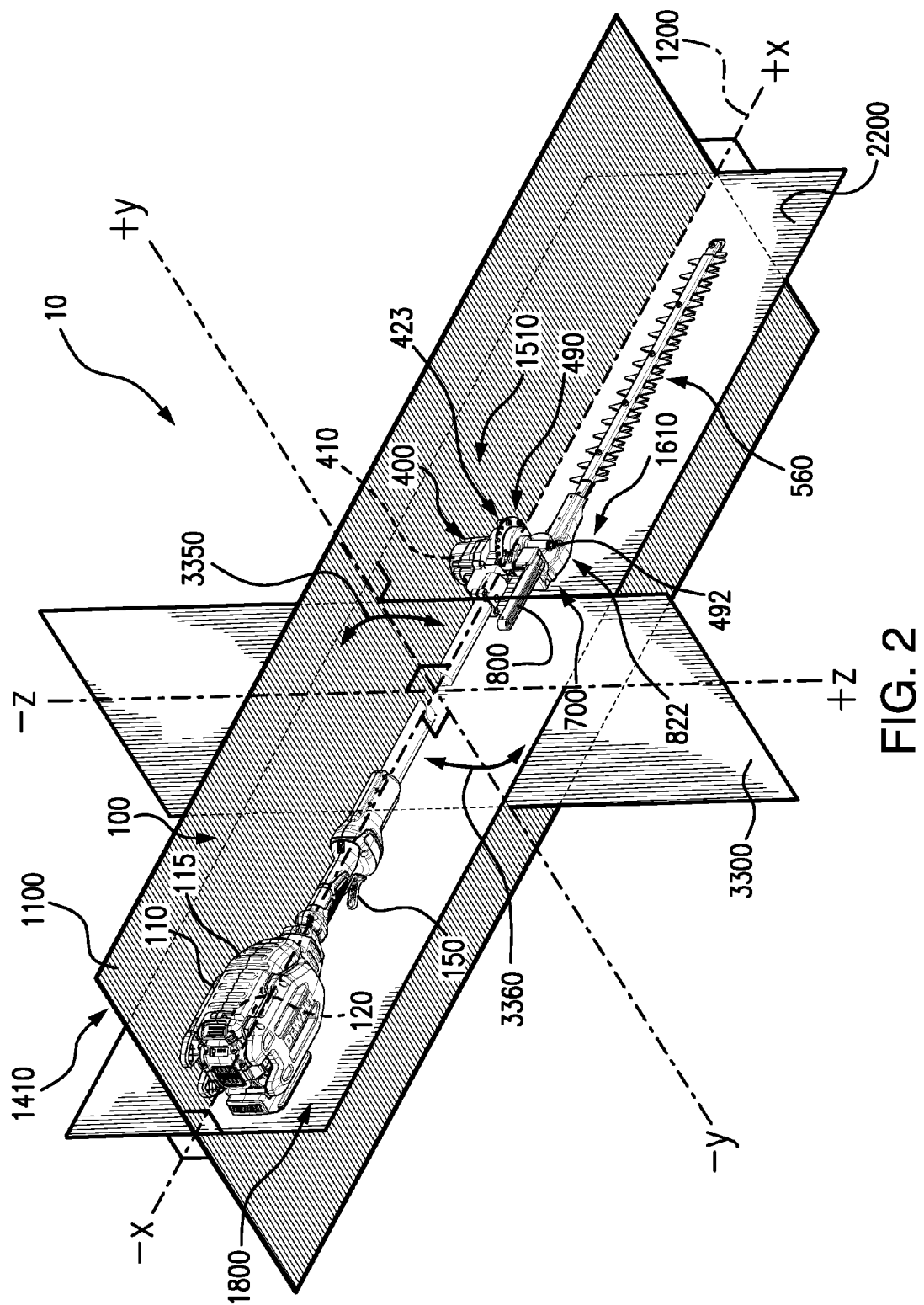
FIG. 2 is a perspective view of a pole hedge trimmer showing geometric planes.

This disclosure relates to the many and varied embodiments of a hedge trimmer technology which can be a pole hedge trimmer (FIG. 1). The embodiments of the pole hedge trimmer disclosed herein can be ergonomically designed and efficient to use. In an embodiment, the pole hedge trimmer can be balanced on either side of a balance plane 1100 (FIG. 1 and FIG. 2). In non-limiting example, the pole hedge trimmer can have a motor-side weight which is substantially balanced with a trimmer-side weight, such that a twisting force in the trim angle plane 3300 (FIG. 2) in an operator's hands about the pole centerline is reduced, minimized or eliminated. In an embodiment, the pole hedge trimmer can be evenly balanced radially and/or circumferentially about an axis which is parallel to or collinear with a pole centerline, such that a twisting force about such an axis is reduced, minimized or eliminated.

In an embodiment, the pole hedge trimmer can have a motor-side center of gravity and a trimmer-side center of gravity balanced on either side of the balance plane 1100. In an embodiment, the pole hedge trimmer can have a center of gravity distribution balanced radially about a pole centerline, a center of gravity axis, or other longitudinal axis.

In an embodiment, the pole hedge trimmer can have a blade which has a lower face distance configured to minimize its distance from the pole centerline and/or the center of gravity axis. In an embodiment, the pole hedge trimmer can have a trimer head with a trimmer head center of gravity configured to minimize its distance from the pole centerline and/or the center of gravity axis. In an embodiment, the pole hedge trimmer can have a motor unit with a motor unit center of gravity configured to minimize its distance from the pole centerline and/or the center of gravity axis. In an embodiment, the pole hedge trimmer can have a power unit having a weight distribution evenly distributed on either side of a balance plane 1100 and/or about the pole centerline and/or the center of gravity axis.

FIG. 1 is a perspective view of a pole hedge trimmer. The example of a pole hedge trimmer 1 of FIG. 1 can have a pole 200 extending from a main body housing 99 having a power unit 110 and a trigger handle 100. The pole can have a pole centerline axis 1200. The pole 200 can optionally be a single pole member, an adjustable length pole 205, a telescoping pole member, or other type of support member. The power unit 110 can have a battery housing 115 and a battery 120. The trigger handle 100 can have a power trigger 150. The power unit 110 can provide power to a motor unit 400. In an embodiment, wires are provided within and along the length of the pole 200 electrically connecting the power unit 110 to the motor unit 400. The power trigger 150 can be used to control the amount of power supplied to the motor unit 400 from the power unit 110.

The pole 200 can be an adjustable length pole 205 having an outer pole 210 and an inner pole 220 in a telescoping configuration. The pole 200 can be connected to and support a trimmer assembly 490. The trimmer assembly 490 can have a motor unit 400, a position system 500 and a trimmer unit 700. The motor unit 400 can have a motor 410 with a motor center of gravity plane 3100 and a motor balance axis 3000. The motor unit 400 can have a multistage gearbox 423.

The trimmer unit 700 can have a trimmer head 822 and a trimmer blade 560. The trimmer unit 700 can have a trimmer unit center of gravity plane 2100 and a trimmer unit balance axis 2000.

The trimmer head 822 can be positioned by orientation handle 800 which can be used to orient the trimmer head for example by rotating the position of the head about trimmer axle 492.

FIG. 2 is a perspective view of a pole hedge trimmer showing geometric planes. FIG. 2 shows an embodiment of the pole hedge trimmer 10 transected by geometric planes on an X, Y, Z coordinate plane. A balance plane 1100 is shown on the XY plane, coplanar with the Y plane in the +Y and −Y directions and intersecting the X axis. A trimming plane 2200 is shown on the XZ axis, coplanar with the X plane in the +X and −X directions and intersecting the Z axis. A trim angle plane 3300 is shown on the YZ plane, coplanar with the Z plane in the +Z and −Z directions and intersecting with the Y axis.

FIG. 2 also shows the top side 1510, the bottom side 1610, the motor side 1410 and the trimmer side 1800 of the pole hedge trimmer 10.

The pole hedge trimmer 10 can be balanced about the balance plane 1100 such that when suspended no trimmer rotational moment exists coplanar the trim angle plane 3300. In an embodiment no trimmer rotational moment exists on the trim angle plane 3300 when the rotor 412 of motor 410 of the pole hedge trimmer 10 is not rotating. In an embodiment no trimmer rotational moment exists to rotate the trim angle plane 3300 when the rotor 412 (FIG. 13A) of motor 410 of the pole hedge trimmer 10 is rotating. In an embodiment no trimmer rotational moment exists planar to the trim angle plane 3300, and/or about the pole centerline axis 1200, when the rotor 412 (FIG. 13A) of motor 410 of the pole hedge trimmer 10 is rotating.

In such embodiment, the rotation moment which can be imparted coplanar to the trim angle plane 3300 is that of the user which is an operator rotational moment. The operator rotational moment can cause the pole hedge trimmer 10 to rotate about the X axis in the X,Y coordinate plane coplanar with the trim angle plane 3300 as shown by first trim angle rotation arrow 3350 and second trim angle rotation arrow 3360. The operator can impart the operator rotational moment to rotate the trimmer blades 570 (FIG. 11) to a trimming angle 3500 (FIG. 9) desired by an operator.

In an embodiment, the pole hedge trimmer 10 is configured such that the physical forces, such as motor torque, do not cause the pole hedge trimmer 10 to twist about the pole centerline axis 1200 in an operator's hands, for nonlimiting example eliminating torque on the trim angle plane 3300.

The pole hedge trimmer 10 has a motor 410 configured such that a motor torque vector is directed coplanar or parallel to the balance plane 1100 axis.

In an embodiment, the weight distribution of the pole hedge trimmer 10 is balanced about the balance plane 1100 such that the weight on the motor side 1410 and on the trimmer side 1800 are the same, or such that the weight forces are balanced, resulting in no rotational moment exists on the trim angle plane 3300. In an embodiment, the weight distribution of the pole hedge trimmer 10 is balanced about the balance plane 1100 when the trimming blade 560 is at any trimming angle.

In an embodiment, 8.5 lbs can be located on the motor side 1410 and 8.5 lbs can be located on the on the trimmer side 1800. In an embodiment, the ratio of motor side weight 1425: the trimmer side weight 1825 are in a ratio in range of 0.8:1.0 to 1:1, or 1:1 to 1:0.8, such as 1:1, 0.8:1, 0.9:1, 1:0.8, or 1:0.9.

In an embodiment, the motor-side center of gravity is located within 6 in of the pole centerline on the motor side 1410 and the trimmer handle-side center of gravity is located within 6 in of the pole centerline on the on the trimmer side 1800 (FIG. 2).

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

Figure 3:
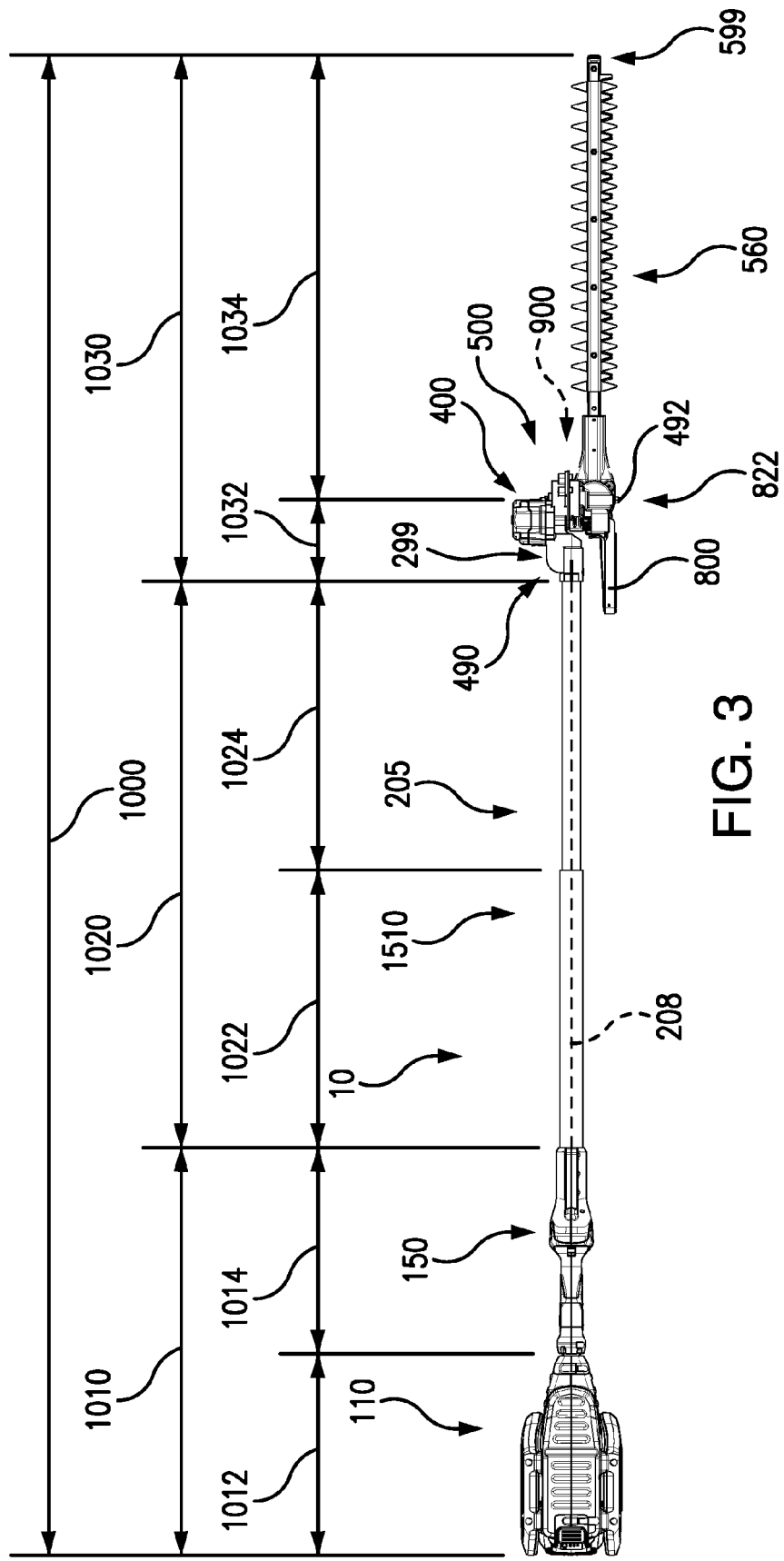
FIG. 3 is a top side view of the pole hedge trimmer.

FIG. 3 is a top side view of the pole hedge trimmer 10. The pole hedge trimmer 10 can have a power unit 110 which can provide electrical power to the motor unit 400. The power unit 110 can have a power trigger 150 (FIG. 1) by which an operator can optionally turn on power to the motor unit 400, turn off power to the motor unit 400, or provide a desired current to the motor unit 400. The power unit 110 can be connected to the trimmer assembly 490 by an adjustable length pole 205. One or more of a power cord, or electrical wiring 208, can be used to transmit power from the power unit 110 to the motor unit 400.

The trimmer assembly 490 can have a motor unit 400, a position system 500, a drive train 900, a trimmer head 822, an orientation handle 800 and a trimmer blade 560. The trimmer blade 560 can have a blade tip 599. The blade 560 can have an open and/or operational and/or trimming and/or cutting configuration when the trimmer assembly 490 is not in a closed state. For example, the an open and/or operational and/or trimming and/or cutting configuration when the orientation handle 800 is in any of a range of orientation handle positions in a range from positive 90° to negative 90°.

[96] A pole hedge trimmer can have a fully unfolded length 1000 can be in a range of 1 m to 10 m, or 1000 mm to 5000 mm, such as 2000 mm, 2400 mm, 2500 mm, or greater. A power unit length 1010 can be in a range of 100 mm to 1000 mm, or 250 to 800, or 500 to 750 mm, such as 400 mm, 500 mm, 600 mm, 650 mm, 675 mm, 700 mm or 750 mm, or greater.

A battery cover length 1012 can be in a range of 100 to 600 mm, or 250 mm to 500 mm, or 300 mm to 400 mm, such as 300 mm, 330 mm, 340 mm, 350 mm or 400 mm, or greater. A trigger handle length 1014 can be in a range of 100 to 600 mm, or 250 mm to 500 mm, or 300 to 400 mm, such as 300, 330, 340, 350 or 400, or greater.

A pole extension length 1020 can be in a range of 0.25 m to 10 m, 0.5 m to 5000 mm, 700 mm, 800 mm, 900 mm, 950 mm, 1000 mm, 1500 mm, 2000 mm, 3000 mm, or greater. A outer pole extension length 1022 can be in a range of 100 mm to 7000 mm, or 250 mm to 1500 mm, or 350 mm to 750 mm, such as 200 mm, 300 mm, 400 mm, 500 mm, or 600 mm, or greater. A inner pole extension length 1024 can be in a range of 100 mm to 7000 mm, or 250 mm to 1500 mm, or 350 mm to 750 mm, such as 200 mm, 300 mm, 450 mm, 550 mm, or 600 mm, or greater.

A trimmer assembly length 1030 can be in a range of 100 mm to 1500, or 500 mm to 1000 mm, such as 500 mm, 600 mm, 700 mm, 800 mm, 900 mm, 1000 mm, 1500 mm, or greater.

A trimmer axle distance 1032 can be in a range of 25 mm to 500 mm, or 100 mm to 200 mm, such as 75 mm, 100 mm, 120 mm, 130 mm, 140 mm, 150 mm, 160 mm, or greater. A blade assembly length 1034 can be in a range of 100 mm to 1000 mm, or 300 to 800 mm, or 500 mm to 750 mm, 500 mm, 600 mm, 650 mm, 700 mm, 750 mm, or greater.

Figure 4:
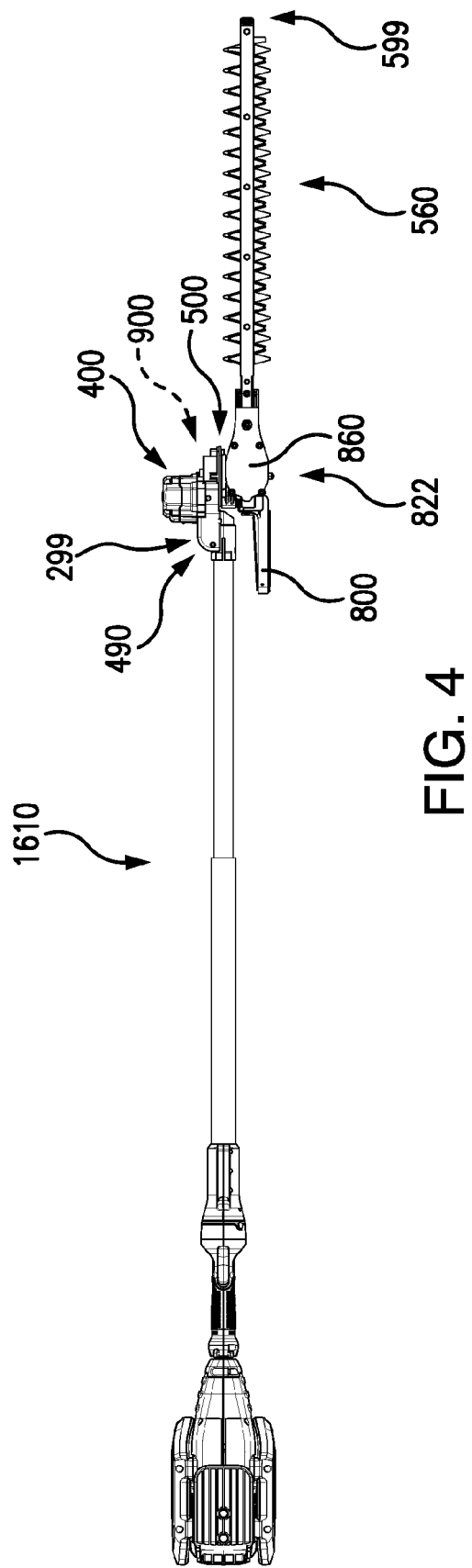
FIG. 4 shows a bottom side view of the pole hedge trimmer.

FIG. 4 shows a bottom side 1610 view of the pole hedge trimmer 10 showing trimmer base plate 860.

Figure 5:
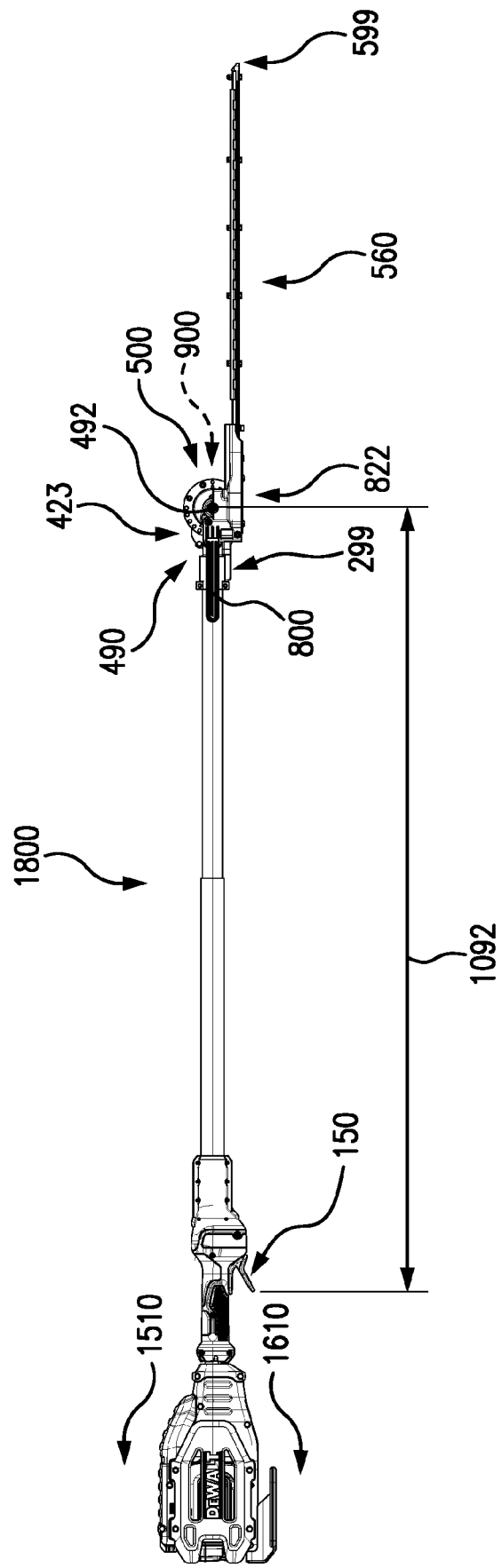
FIG. 5 shows a side view of the pole hedge trimmer.

FIG. 5 shows a trimmer side 1800 view of the pole hedge trimmer 10. FIG. 5 also indicates the orientations of the top side 1510 and the bottom side 1610 of the pole hedge trimmer 10.

Figure 6:
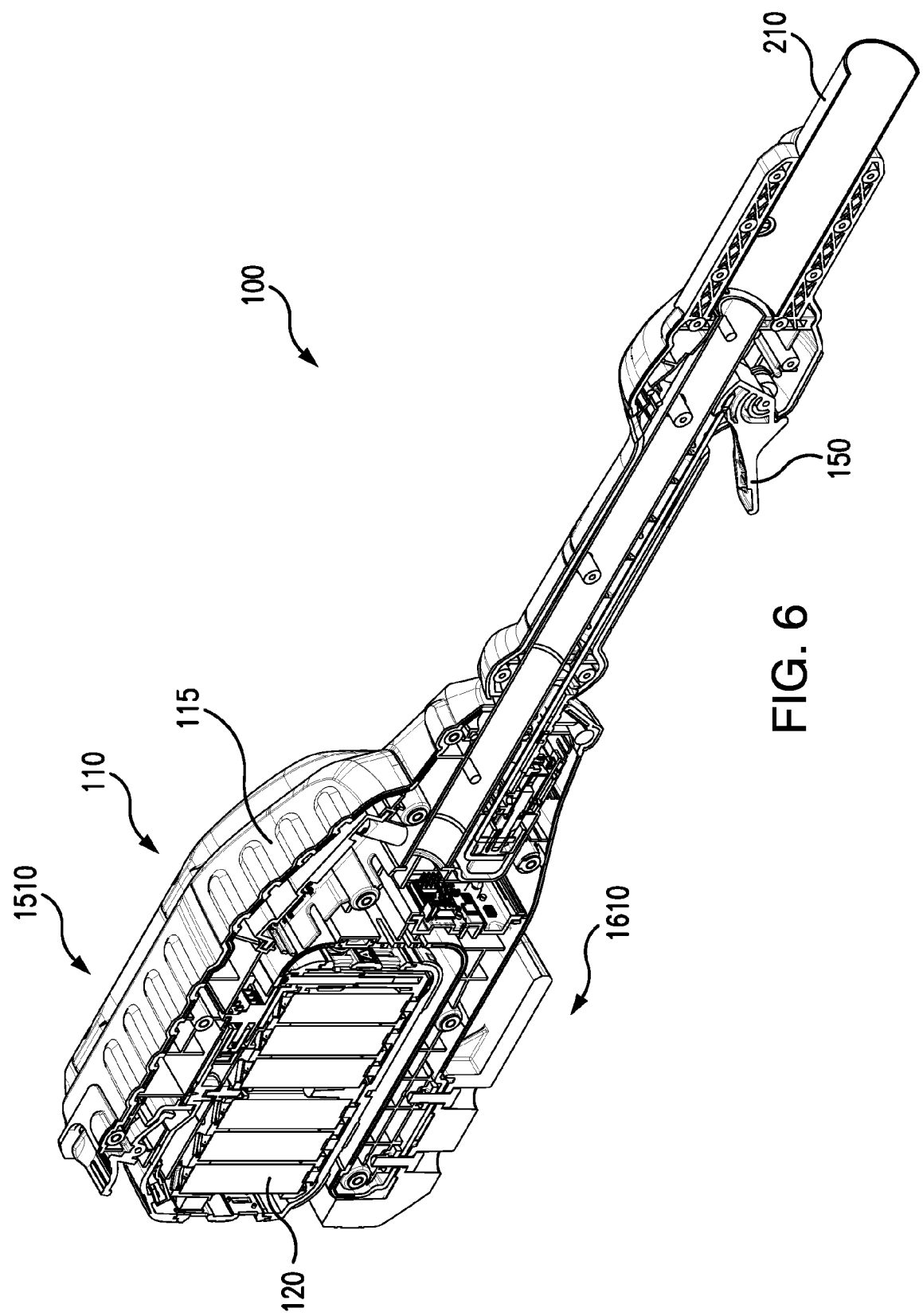
FIG. 6 is a cross section of the power unit.

FIG. 6 is a cross section of the power unit 110. FIG. 6 shows a battery 120 housed at least in part by a battery housing 115. The power output from the batter 120 to the motor unit 400 can be regulated by the power trigger 150, which can be a variable switch provide power to the motor unit 400 at a level determined by an operator by the movement of the power trigger 150. In an embodiment, the power trigger 150 can be configured proximate to a portion of an outer pole 210.

FIG. 6 also shows a trigger to trimmer axle length 1092 which can be in a range of from 16 inches to 30 ft, or greater. In an embodiment, when the trimmer unit 700 is in a closed configuration and the pole 200 has been configured to its short configuration, the trigger to trimmer axle length 1092 can be less than 100 in, or less than 75 in, or less than 50 inches, or less than 30 inches, such as 50 inches. For example, the trimmer axle 492 to power trigger 150 distance of the pole hedge trimmer 10 when the blade 560 is at 180° extended position with the pole can be approximately 51 in. In another embodiment, the trimmer axle 492 to power trigger 150 distance of the pole hedge trimmer 10 when the blade 560 is in a closed position overlapping the pole can be approximately 51 in.

Figure 7:
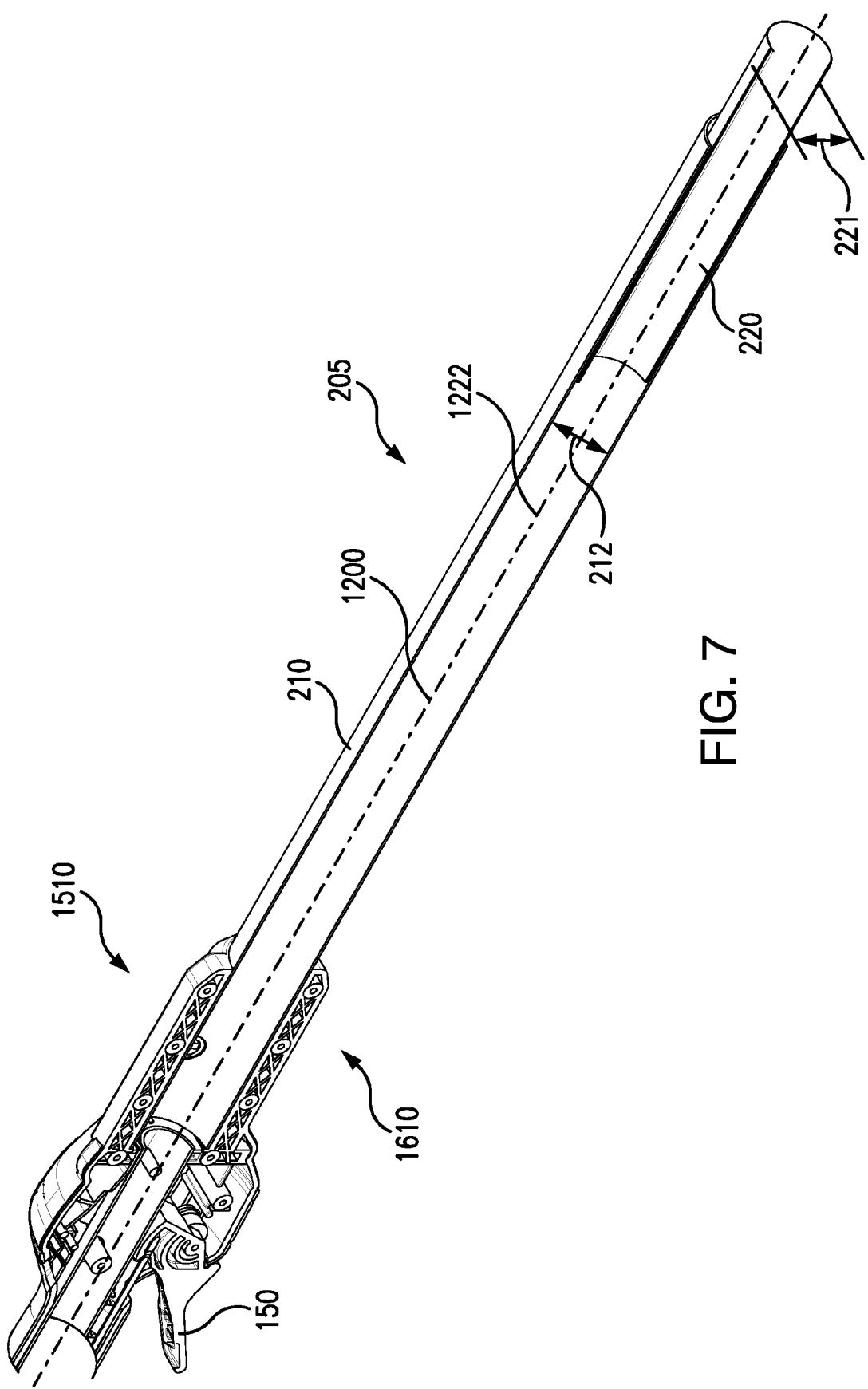
FIG. 7 is a cross sectional detail of the adjustable length pole having a pole centerline axis.

FIG. 7 is a cross sectional detail of the adjustable length pole 205 having a pole centerline axis 1200. In an embodiment, the adjustable length pole 205 can be telescoping, or otherwise adjustable. In the example shown in FIG. 7, an outer pole 210 having can have an outer pole inner diameter 212, can slideably engage with an inner pole 220 which can have an inner pole outer diameter 221, optionally configured fit coaxially within the outer pole inner diameter 212. The outer pole 210 can overlap at least a portion of the inner pole 220 in a telescoping manner.

Figure 8:
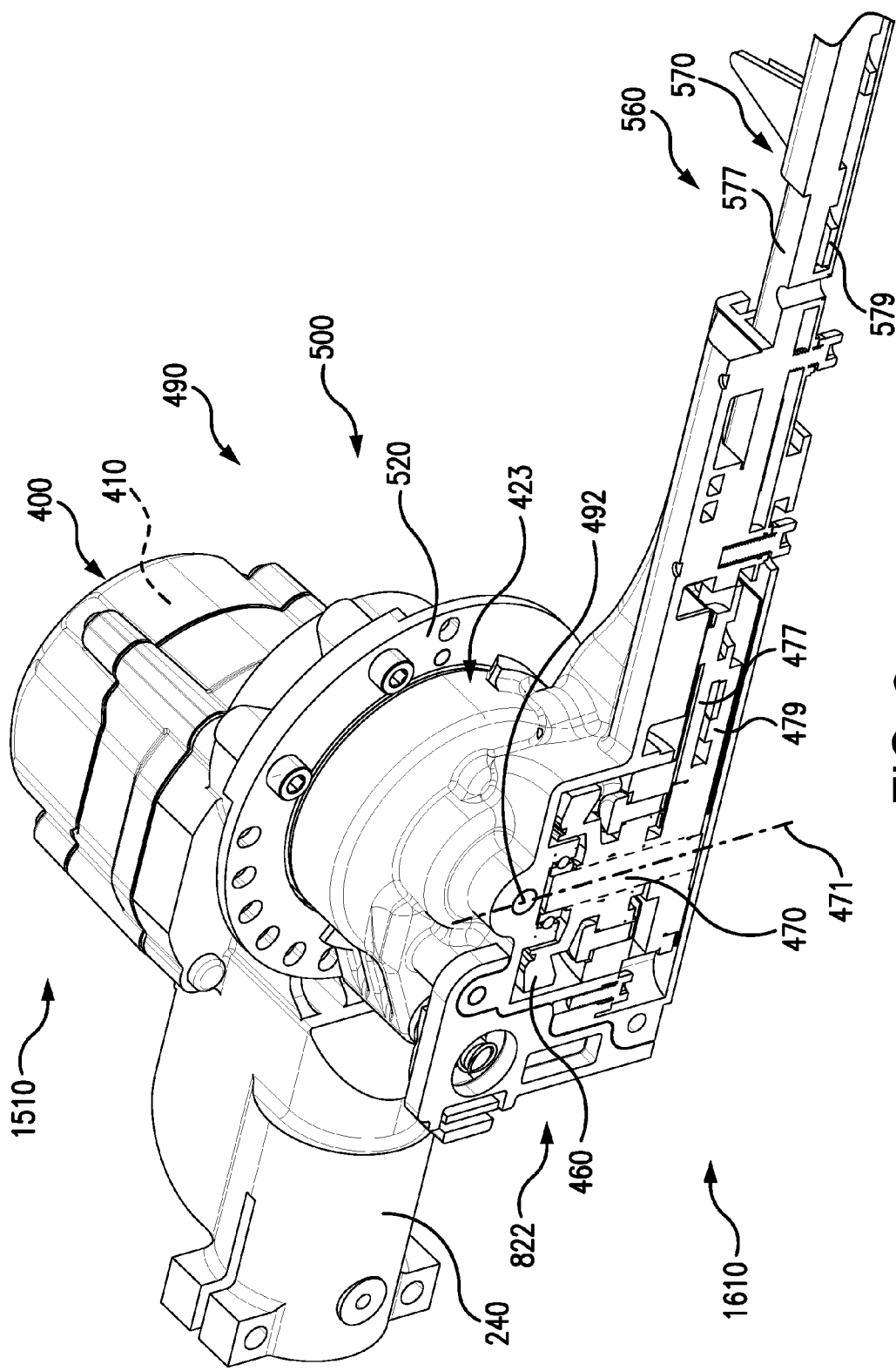
FIG. 8 is a cross sectional view of the trimmer assembly.

FIG. 8 is a perspective view of the trimmer assembly 490. FIG. 8 shows a pole coupling 240 which connects the trimmer assembly 490 to the adjustable length pole 205. FIG. 8 shows the motor unit 400, the position system 500, the multistage gearbox 423, the position system 500 can have the orientation lock disk 520, and the trimmer head 822 can have the orientation handle 800 and the trimmer blade 560. In an embodiment, the lock disc 520 is configured not to intersect the balance plane 1100 and/or the plane of the lock disc 520 is configured not to intersect the balance plane 1100. In another embodiment, the lock disc 520 is parallel with the balance plane 1100.

Figure 15:
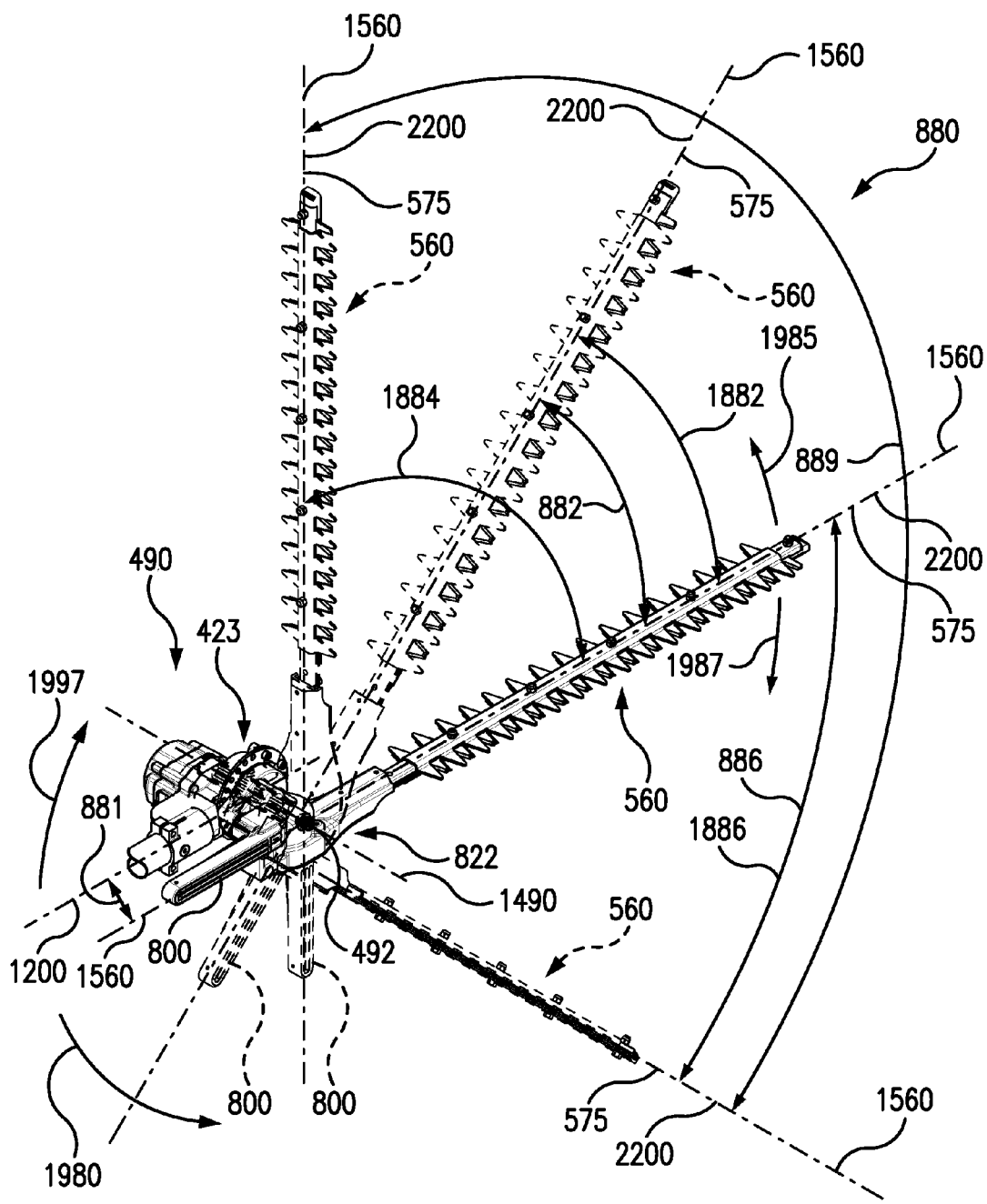
FIG. 15 shows the trimmer assembly having the trimmer blade positioned at a number of different trimmer angles.

FIG. 8 also shows a cross sectional view of the trimmer head 822. The trimmer head can have a trimmer axle 492 about which the trimmer head can rotate to a desired trimmer angle 880 (FIG. 15). The 2nd reduction output gear 460 can drive the eccentric 470. The trimmer blade 560 can have a number of trimmer blades 570. For example, the eccentric 470 can drive a first connecting rod 477 which can drive the first blade 577 and a second connecting rod 479 which can drive the second blade 579.

Figure 9:
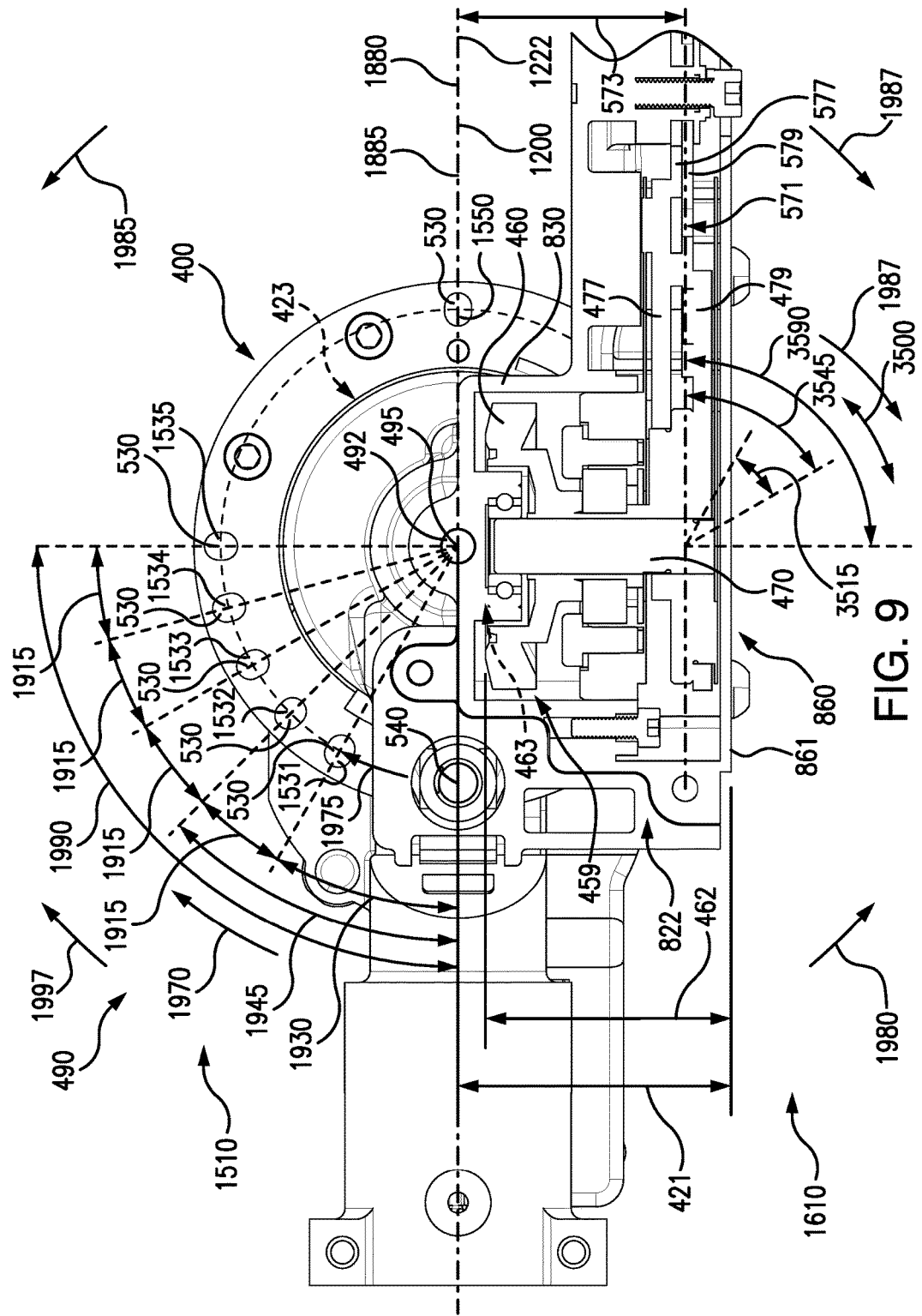
FIG. 9 shows a cross sectional view of the trimmer head.

FIG. 9 shows a cross sectional view of the trimmer head 822. FIG. 9 also shows the orientation lock disk 520 (FIG. 8) having a plurality of the radial lock opening 530. The lock disk 520 can have 1 . . . n of the radial lock opening 530 in which n can be large, such as n=100. In non-limiting example, the lock disk 520 can have a number of the radial lock opening 530 which can range from 1 to 24, such as 10.

FIG. 9 shows the following of the plurality of the radial lock opening 530: 1st radial lock opening 1531. 2nd radial lock opening 1532, 3rd radial lock opening 1533, 4th radial lock opening 1534, 5th radial lock opening 1535 and 6th radial lock opening 1550.

An operator can change the trimming angle 3500 by moving the location of the orientation lock pin 540 (FIG. 11) to be reversibly engaged with a selected of the radial lock opening 530. In an embodiment, the lock pin 540 intersects the balance plane 100. In another embodiment, an axis of the lock pin lock pin 540 intersects the balance plane 100.

Herein, a positive handle rotation 1997 will result in a negative trimmer blade rotation 1987. A negative handle rotation 1980 will result in a positive trimmer blade rotation 1985.

For example, the orientation lock pin 540 can be disengaged and the orientation handle 800 moved through a positive 90° handle rotation angle 1990 such that the orientation lock pin 540 is reversibly engaged with the 5th radial lock opening 1535 which move the trimmer blade 560 to a trimmer angle 880 of a negative 90° trim angle 3590. In another example, the orientation handle 800 can be moved through a positive 45° handle rotation angle 1945 such that the orientation lock pin 540 is reversibly engaged with the 2nd radial lock opening 1532 which moves the trimmer blade 560 to a trimmer angle 880 of a negative 45° trim angle 3545.

The trim angle can be moved at an increment between adjacent or non-adjacent of the plurality of the radial lock opening 530, such as a handle rotation increment 1915 which is in the positive direction of a positive handle rotation 1970. The positive handle rotation 1970 and/or positive lock pin rotation 1975 can achieve a negative trimmer blade rotation 1987. Moving the orientation handle 800 the opposite direction can achieve a negative handle rotation 1980 (FIG. 15) which can achieve a positive trimmer blade rotation 1985 (FIG. 15).

The movement of the orientation handle 800 by one of the handle rotation increment 1915 can change the trimmer angle 880 by a trim angle increment 3515. In the example of FIG. 9, the handle rotation increment 1915 and the trim angle increment 3515 can have the same value. Optionally, the handle rotation increment 1915 and the trim angle increment 3515 can be different.

In another non-limiting example, the orientation handle 800 can move the orientation lock pin 540 to the 1st radial lock opening 1531 which can achieve a handle rotation 1930 of 30° and a trim angle increment of negative 30°. For example, the handle rotation increment 1915 can have a value in a range of 1° to 360°, such as 10°, or 15°. The trim angle increment 3515 can have a value in a range of 1° to 360°, such as 45°.

Figure 24:
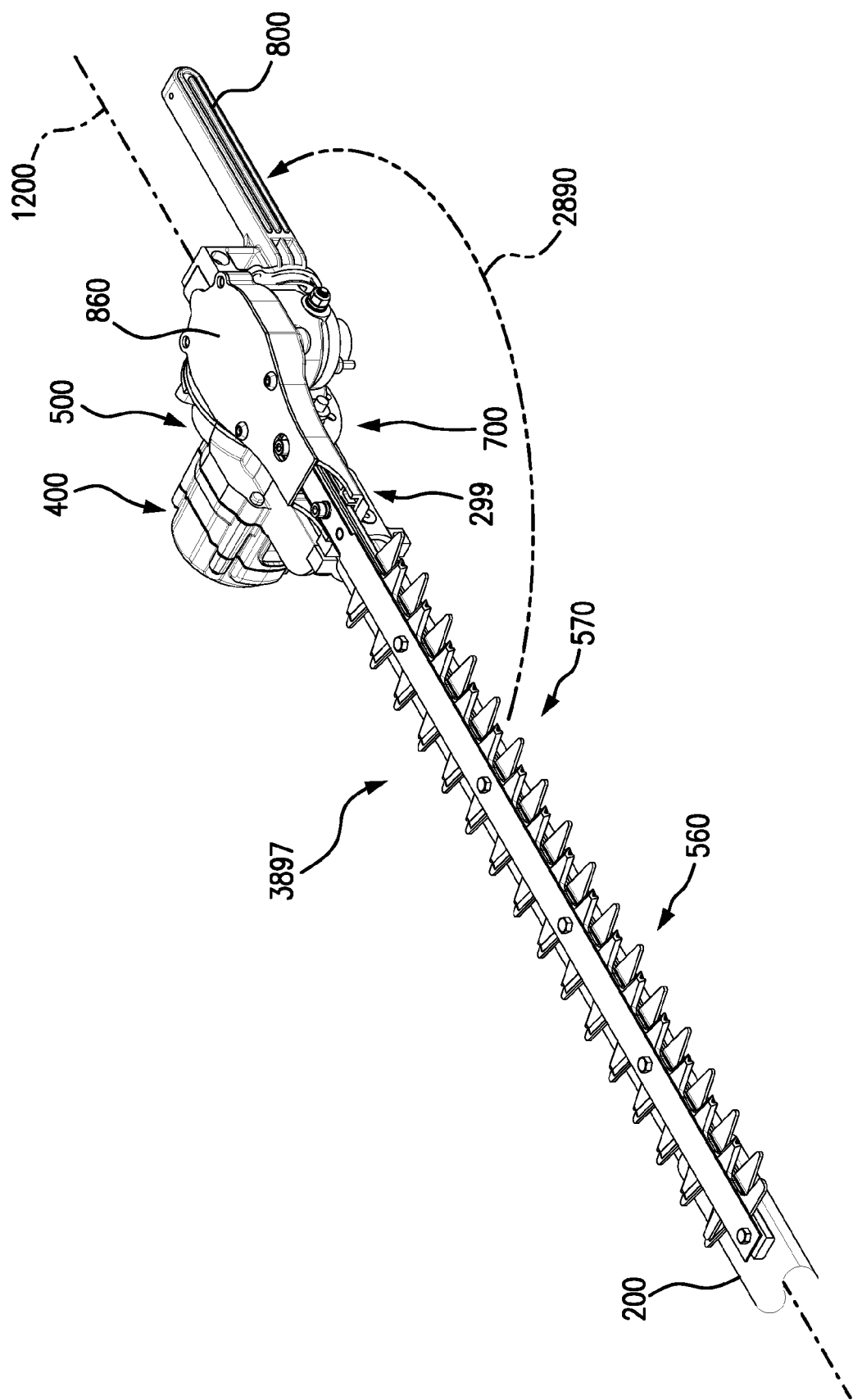
FIG. 24 shows the trimmer blade in a folded position.

In an embodiment, certain of the radial lock opening 530 can achieve a configuration of the trimmer blade 560 to achieve a pre-set state. For example, when the orientation lock pin 540 is engaged with the 6th radial lock opening 1550, the trimmer blade 560 is in a folded, or closed, configuration for storage. (FIG. 24)

Other pre-sent configurations include 45° (positive 45°) blade position, in an embodiment achieved with setting a negative 45° orientation handle 800 position, is a low cutting position, such as for grass and low shrubs (FIG. 15).

Figure 16E:
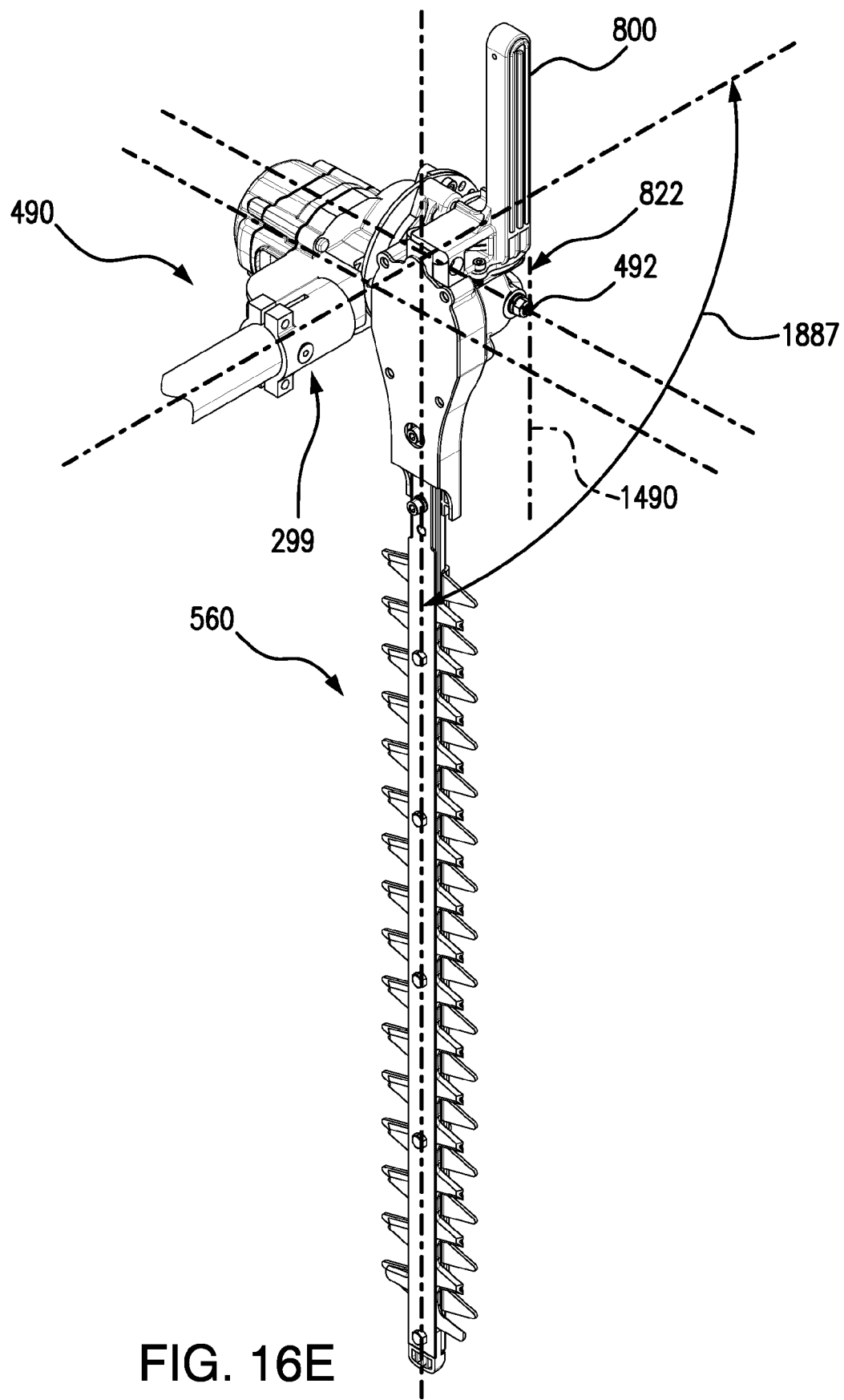
FIG. 16E shows the trimmer blade configured at a negative 90° trimmer angle.

Other pre-sent configurations include −90° (negative 90°) blade position, in an embodiment achieved with a positive 90° handle position, is a tall cutting position, such as for the top of tall trees (FIG. 16E).

FIG. 9 shows the orientation pin centerline 1880 can be set by the position of the orientation lock pin 540 and which in one setting can optionally collinear with the straight trimming angle 1885, as well as optionally with the pole centerline axis 1200 and/or the center of gravity axis 1222.

FIG. 9 also shows dimensions of trimmer head 822. In the embodiment of FIG. 9, the blade interface distance 573 can be measured from the orientation pin centerline 1880, which optionally can be coplanar with the pole centerline axis 1200, to the blade interface 571. An input bevel gear height 462 can be measured from the trimmer base plate lower surface 861 of the lower base plate 860 to an upper input bevel surface 463 of an input bevel gear 459. An output spindle centerline height 421 can be measured from the trimmer base plate lower surface 861 to the orientation pin centerline 1880.

Figure 10:
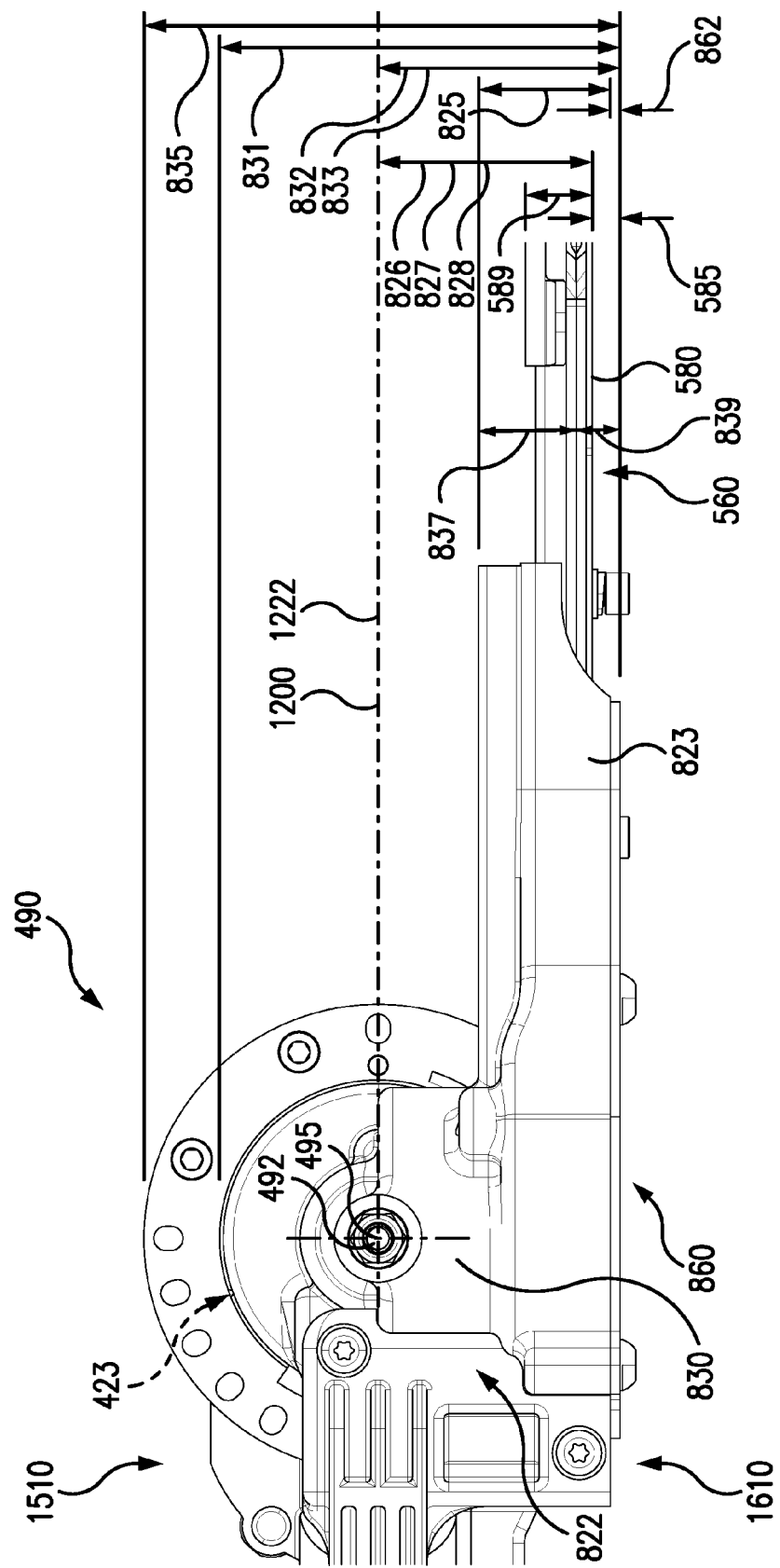
FIG. 10 shows a side view of the trimmer assembly.

FIG. 10 shows a side view of the trimmer assembly 490 having example dimensions. In the embodiment of FIG. 10, the total trimmer assembly height 835 can be in a range of 150 mm to 25 mm, such as 98 mm. The gearbox height 831 can be in a range of 145 mm to 25 mm, such as 81 mm. The trimmer drive casing height 832 can be in a range of 100 mm to 25 mm, such as 49.6 mm. The trimmer axle centerline height 833 can be in a range of 100 mm to 25 mm, such as 49.6 mm.

The trimmer blade cover height 825 can be in a range of 100 mm to 5 mm, such as 29 mm. Trimmer blade height 589 can be in a range of 4 mm to 50 mm, such as 11.7 mm. The lower blade face clearance 585 can be in a range of 50 mm to 0 mm, such as 5.7 mm. The base plate thickness 862 can be in a range of 0.5 mm to 5 mm, such as 2 mm.

Figure 11:
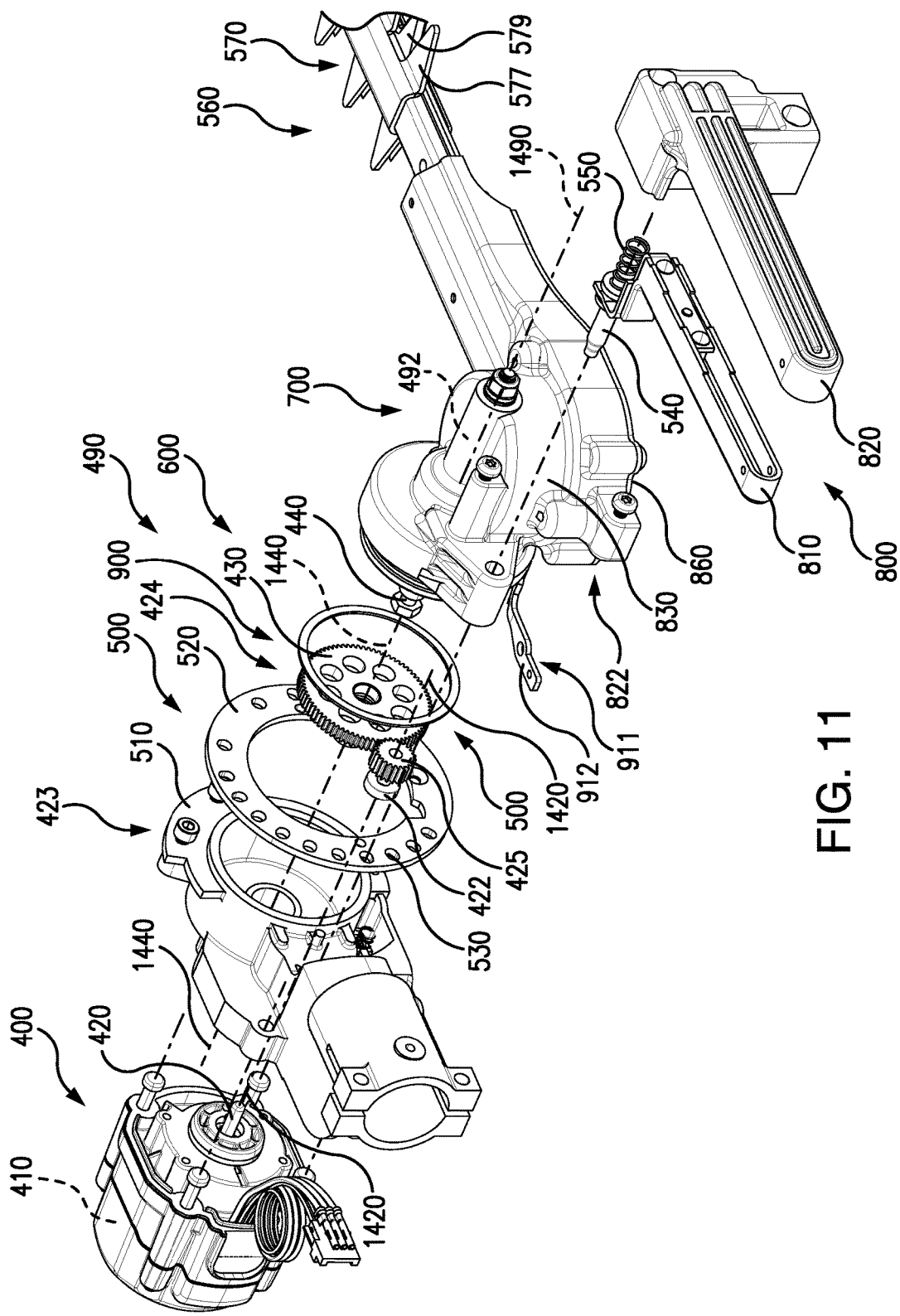
FIG. 11 is an exploded view of the trimmer assembly.

FIG. 11 is an exploded view of the trimmer assembly 490 which can have a motor unit 400, a position system 500, a power transfer system 600 and a trimmer unit 700.

In the example embodiment of FIG. 11, the motor unit 400 can have a motor 410 which can drive an output spindle 420 which can have an output spindle centerline 1420. The output spindle 420 can be borne by a driver gear bearing 422 and can drive a drive gear 425, which can be meshed with an 1st reduction output gear 430. In an embodiment, a hedge trimmer can have a reduction gearing such as a double reduction gearing, or a triple reduction gearing.

In the example embodiment of FIG. 11, the position system 500 can have an orientation base member 510 to which an orientation lock disk 520 having a plurality of a radial lock opening 530 can be attached. FIG. 11 also shows a trimmer axle 492 about which the trimmer unit 700 can be radially oriented as shown for example in FIGS. 15-17.

The orientation lock disk 520 can be used to reversibly lock (herein to "reversibly lock" and "relaseably lock" are synonymous terms) the trimmer unit 700 at a trimmer angle 800 selected by an operator. In the embodiment of FIG. 11, an orientation lock pin 540 can be reversibly engaged with a radial lock opening 530 selected by an operator. Optionally, the orientation lock pin 540 can be engaged and disengaged by a pin retractor 811 (FIGS. 13A-14B) of a trimmer handle trigger 810 of an orientation handle 800.

Figure 13A:
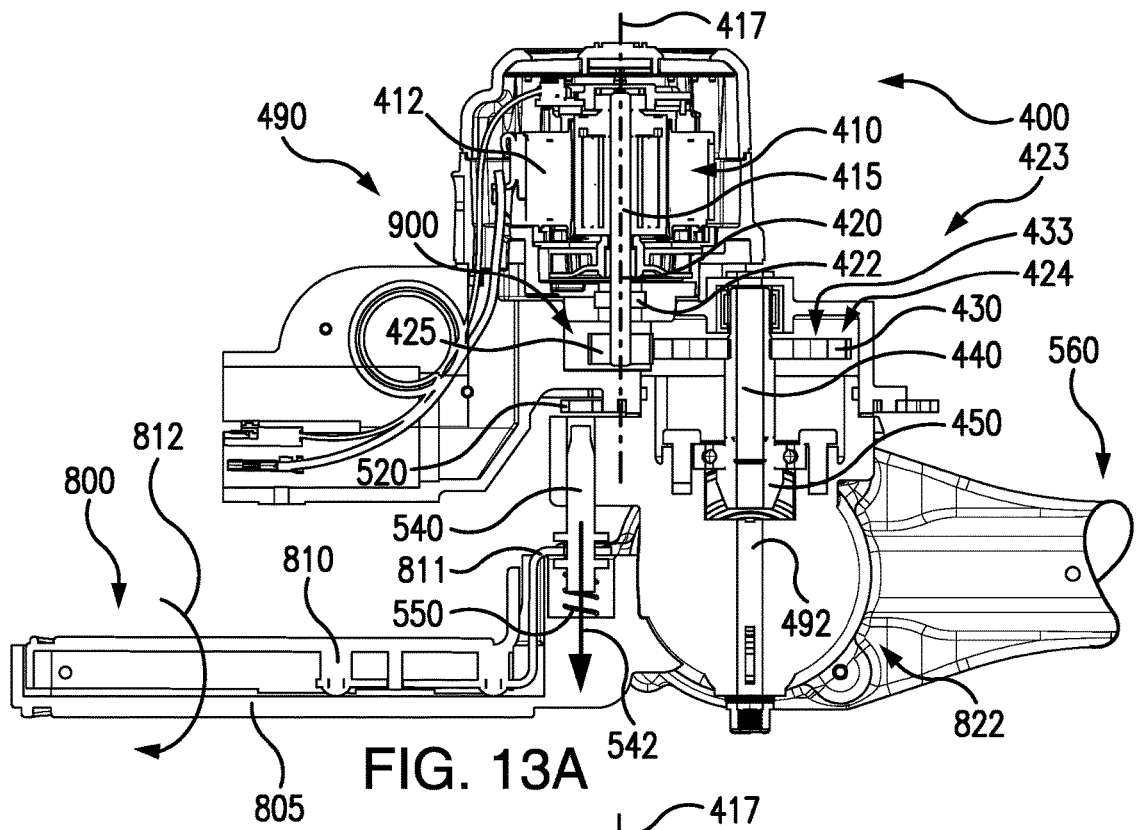
FIG. 13A is a top view of the drive train of the pole hedge trimmer.

In the example embodiment of FIG. 11, the power transfer system 600 can have a drive train 900. The motor 410 can have a rotor 412 (FIG. 13A) which has a rotor shaft 415 (FIG. 13A) which can drive the output spindle 420 to rotate about output spindle centerline 1420. The output spindle 420 can be borne by a drive gear bearing 422 and can drive the driver gear 425. In an embodiment, the drive train 900 can have a multistage gearing 424. The drive gear 425 can drive a 1st reduction output gear 430 which drives a bevel drive gear 450 (FIG. 13A). In an embodiment, the output drive gear 430 can turn an intermediate shaft 440 which can bear the bevel drive gear 450. The bevel drive gear 450 can drive the 2nd reduction output gear 460 (FIG. 9) which can drive the eccentric 470 (FIG. 9). The eccentric 470 can drive the trimmer blades 570 which can have a first blade 577 and a second blade 579.

An intermediate shaft axis 1440 is shown in the embodiment of FIG. 11 collinear with the trimmer axle centerline 1490.

In the example embodiment of FIG. 11, the trimmer unit 700 can have a trimmer blade 560 having trimmer blades 570 which can have a first blade 577 and a second blade 579, as well as an orientation handle 800 which can be used to orient a trimmer head 822 to reversibly orient the trimmer blade 560 at a trimmer angle 880 (FIGS. 15-17) selected by an operator.

The trimmer head 822 can have trimmer drive casing 830 which can at least in part house the 2nd reduction output gear 460 (FIG. 9), the eccentric 470 and a first connecting rod 477 (FIG. 9) which drives the first blade 577 and a second connecting rod 479 (FIG. 9) which drives the second blade 579. In the example of FIG. 11, the orientation handle 800 can be attached to the trimmer head 822 and the orientation lock pin 540 which can be moved by the trimmer handle trigger 810 can transverse at least a portion of the trimmer driver casing 830 to reversibly engage and disengage with the orientation lock disk 520.

Figure 13B:
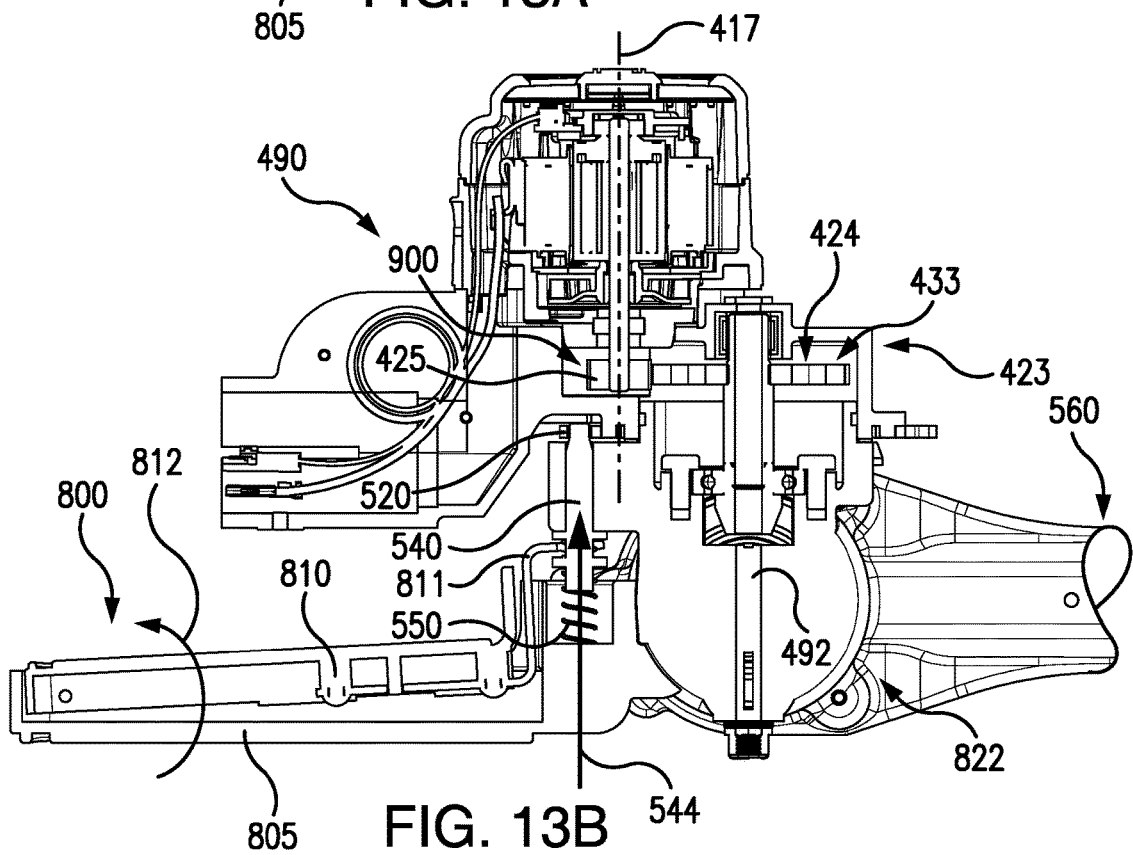
FIG. 13B shows the orientation lock pin moving in the lock pin lock direction.

In the example embodiment of FIG. 11, the orientation handle 800 can be moved by an operator to orient the trimmer head 822 about the trimmer axle centerline 1490 to achieve a desired trimming angle 3500 (FIG. 9). In an embodiment, the orientation handle 800 can optionally have a trimmer handle cover 820 which can cover a trimmer handle trigger 810 at least in part. The trimmer hand trigger 810 can have the pin retractor 811 which can impart an unlocking force 556 in the lock pin release direction 542 upon orientation lock pin 540 to overcome the spring bias 551 of the lock pin spring 550 which provides a locking force 552 in the lock pin lock direction 544 (FIGS. 13A-13B). The trimmer unit 700 can also have a safety switch 911 which has a safety level 912.

Figure 12:
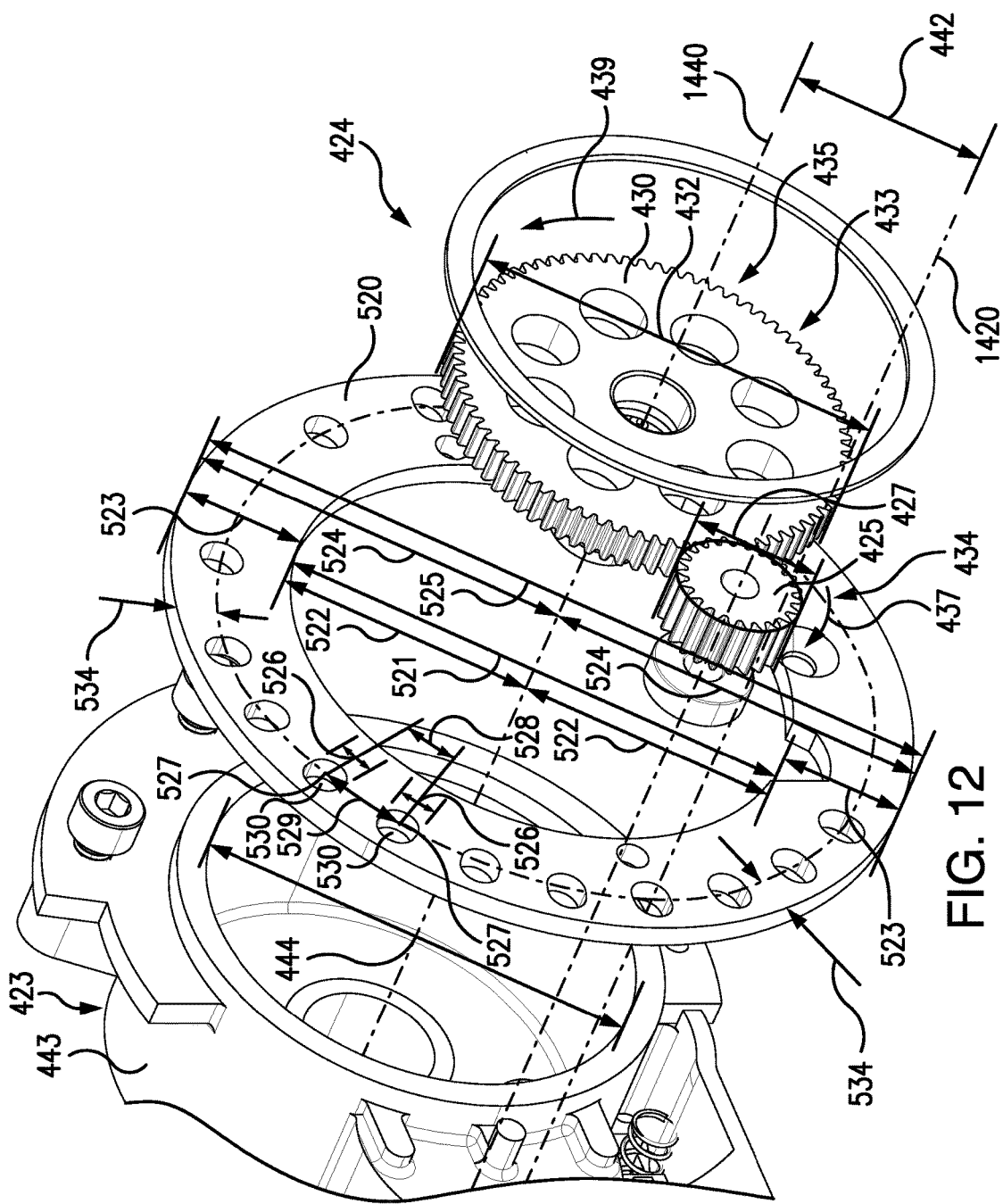
FIG. 12 shows an exploded view of the multistage gear box.

FIG. 12 shows an exploded view of the multistage gear box 423. The multistage gear box 423 can have an output gear casing 443 which can house multiple gears having the same or different diameters. In the embodiment of FIG. 12, the output gear casing 443 can house a drive gear 425 and an 1st reduction output gear 430.

In non-limiting example, the multistage gear box 423 can house the multistage gearing 424 such as for example a two stage gear reduction 433. In FIG. 12 the first stage gear 434 can be the drive gear 425 and the second stage gear 435 can be the 1st reduction output gear 430.

The first stage gear 434, such as the driver gear 425, to the second stage gear 435, such as the 1st reduction output gear 430, can have a gear ratio of first stage gear 434 to second stage gear 435 in the range of from 12:1 to 1:1, such as 3.39:1.

As shown in FIG. 12 the driver gear 425 can have a drive gear diameter 427 which can be in a range of 5 mm to 50 mm, such as 16 mm.

The 1st reduction output gear 430 can have a 1st reduction output gear diameter 432 which can be in a range of 5 mm to 200 mm, such as 52 mm.

In the non-limiting example of FIG. 12 the driver gear 425 and the 1st reduction output gear 430, can have diameters which are in a ratio of the drive gear 425:1st reduction output gear 430 of 1:1 to 12:1, such as 3.39:1.

In an embodiment, the drive gear speed 437 of the drive gear 425 can be in the range of 0 rpm to 60000 rpm, such as 23000 rpm. The output gear speed 439 of the 1st reduction output gear 430 can be in a range of nearly 0 (zero) to 60000, such as 6784.

The ratio of driver gear speed 437:output gear speed 439 can be in the range of 1:1 to 12:1, such as 3.39:1.

In the example of FIG. 12, the driver gear 425 and the 1st reduction output gear 430 can be housed at least in part by the output gear casing 443 which can have and output gear case diameter 444.

FIG. 12 also shows a detail of the orientation lock disk 520. The lock disk 520 can have a lock disk outer diameter 525 and a lock disk outer radius 524. The lock disk 520 can have a lock disk inner diameter 521 and a lock disk inner radius 522. The lock disk 520 can also have a lock disk width 523.

In the example embodiment of FIG. 12, the lock disk 520 can have a plurality of a radial lock opening 530 which can have a radial lock opening diameter 526 and, a radial lock opening centerpoint 527 and a radial lock separation angle 528 between two adjacent of the radial lock opening center point 527. The two adjacent of the radial lock opening center point 527 can be separated by a radial lock opening separation 529. The lock disk 520 can have lock opening centerline circumference 532 which can pass through each of the radial lock opening centerpoint 527. The plurality of a radial lock opening 530 of the lock disk 520 can be located at a lock opening centerline offset 534.

FIG. 13A is a top view of the drive train 900 of the pole hedge trimmer 10. In the example shown in FIG. 13A, the drive train 900 can have a multistage gear box 423 which can house a multistage gearing 424 at least in part.

The motor unit 400 can have a motor 410 which has a rotor 412 having a rotor shaft 415. The rotor shaft 423 can drive the output spindle 420 which can rotate the drive gear 425 which can drive the 1st reduction output gear 430. The output drive gear 430 can provide a motive force to drive an eccentric 470 (FIG. 8).

In an embodiment, the output drive gear 430 can turn an intermediate shaft 440 which can bear a bevel drive gear 450. The bevel drive gear 450 can drive a 2nd reduction output gear 460 (FIG. 8) which can drive the eccentric 470.

FIG. 13A also shows a cross sectional view of the orientation handle 800 having the trimmer handle trigger 810 in a depressed state. As shown in FIG. 13A, the orientation handle 800 can have a handle grip 805 and a trimmer handle trigger 810. As shown in FIG. 13A, the trimmer handle trigger 810 can use a pin retractor 811 which can disengage the orientation lock pin 540 from the orientation lock disk 520, for example by moving the pin in the lock pin release direction 541.

In an embodiment, the movement of the pin retractor 811 to disengage the orientation lock pin 540 in the lock pin release direction 542 can overcome the spring bias of lock pin spring 550 and retract the orientation lock pin 540 from the orientation lock disk 520 which can allow an operator to move the trimmer head 822 and trimmer blade 560 to a desired trimmer angle 880.

FIG. 13B shows the orientation lock pin 540 moving in the lock pin lock direction 544 which can engage the orientation lock pin 540 with a radial lock opening 530 of the orientation lock disk 520 and lock the trimmer blades 570 at the trimmer angle 880 selected by an operator.

Figure 14A:
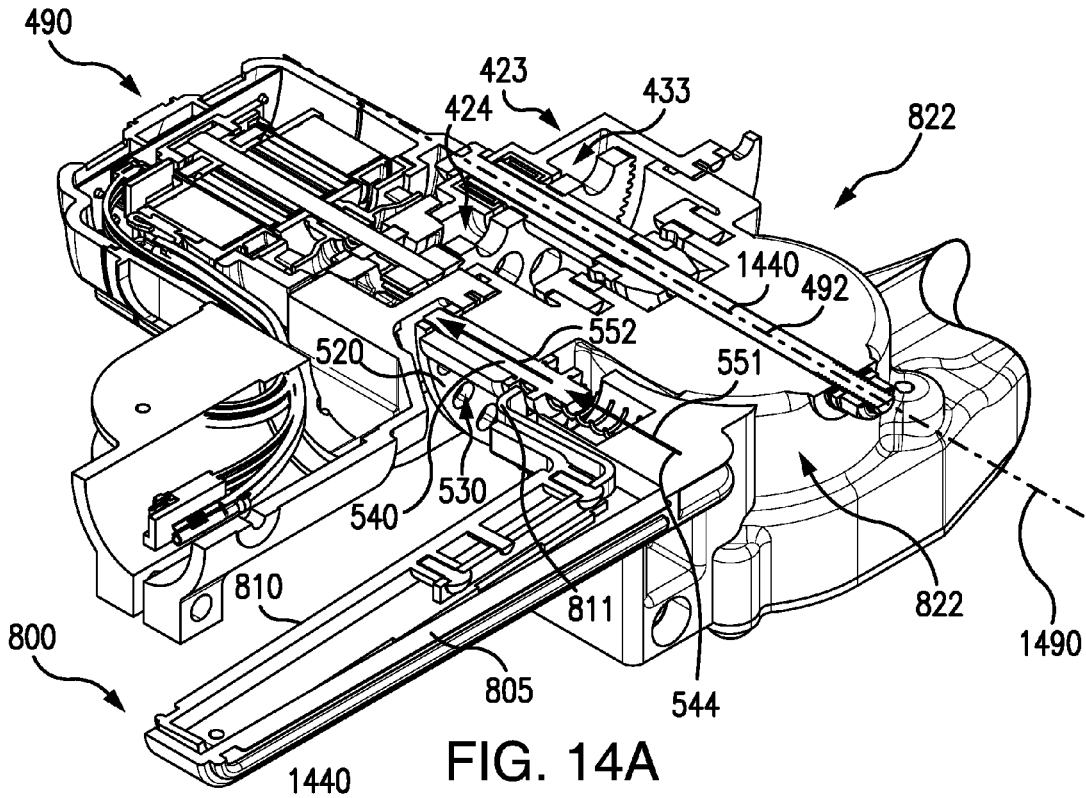
FIG. 14A is a cross sectional view showing the trimmer head having the orientation lock pin engaged with a radial lock opening of an orientation lock disk.

FIG. 14A is a cross sectional view showing the trimmer head 822 having the orientation lock pin 540 engaged with a radial lock opening 530 of the orientation lock disk 520. As shown in FIG. 14A, the orientation lock pin 540 is in a locked state and is experiencing the locking force 552 imparted by the spring bias 551 of the lock pin spring 550 in the pin lock direction 544.

Figure 14B:
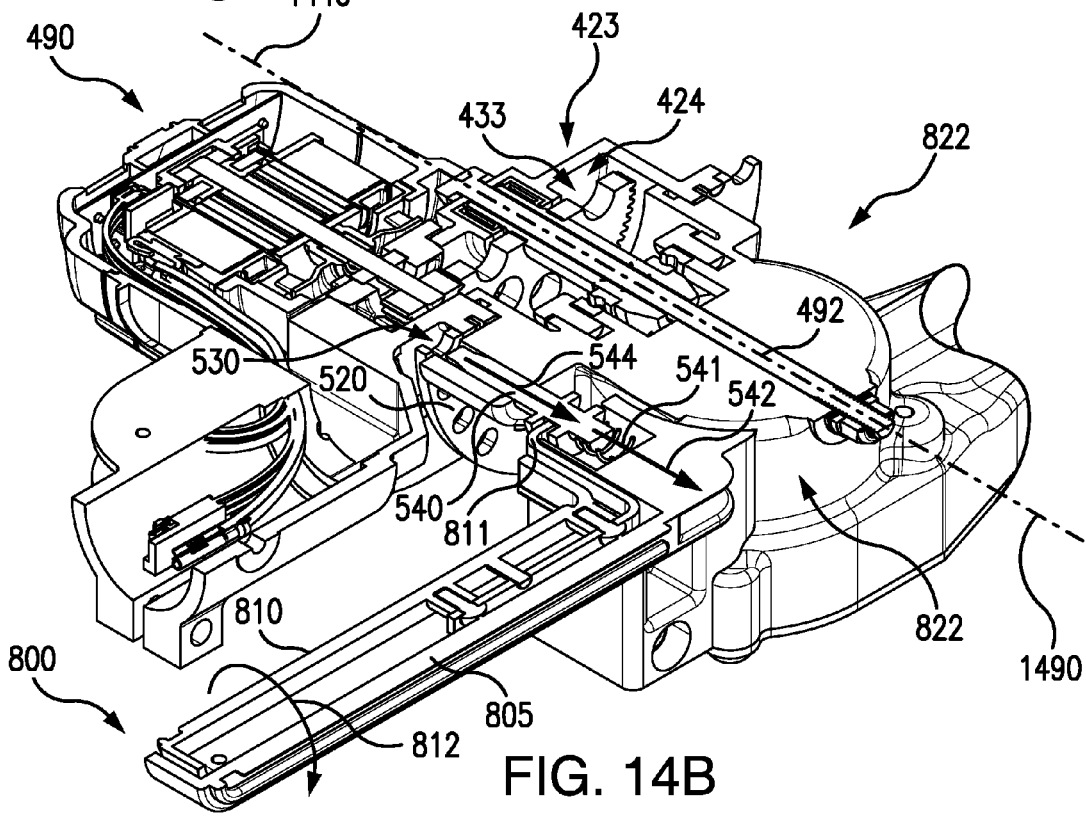
FIG. 14B is a cross sectional view showing the trimmer head having the orientation lock pin disengaged from the radial lock opening of the orientation lock disk.

FIG. 14B is a cross sectional view showing the trimmer head 822 having the orientation lock pin 540 disengaged from the radial lock opening 530 of the orientation lock disk 520. FIG. 14B shows the orientation lock pin 540 in an unlocked state having been reversibly retracted from engagement with the orientation lock disk 520 by movement of the trimmer handle trigger 810 in the trimmer handle compression direction 812 which can impart an unlocking force 554 in the lock pin release direction 542 which can be in the pin unlock direction 541, overcoming the spring bias 551 (FIG. 14A).

FIG. 15 shows the trimmer assembly 490 having the trimmer blade 560 positioned at different examples of a trimmer angle 880. When the trimmer head 822 is an unlocked state 822, an operator can grip the orientation handle 800 and rotate the trimmer blade 560 about the trimmer axle axis 492 into a desired position relative to the pole centerline axis 1200 to achieve a trimmer angle 880. In an embodiment the trimmer angle 880 can be measured between a pole centerline plane 1201 which can be coplanar with the pole centerline axis 1200 and parallel with the trimmer axle centerline 1490, and the trimming plane 2200 which can be coplanar with the trimmer blade interface 575. The trimmer blade centerline 1560 can have blade centerline radial offset 881 from the pole centerline axis 1200 in a range of 60 mm to 0 mm, such as 37.5 mm. In an embodiment, the trimmer blade interface offset weight can be configured in the vertical plane from the pole centerline axis 1200 in a range of 60 mm to −60 mm, such as 40.6 mm.

FIG. 15 shows the trimmer blade 560 at a number of the trimmer angle 880. The trimmer angle can be configured at a position along a range of trimmer angle 889. The trimmer blade 560 can be moved by the use of orientation handle 800 to achieve a positive blade rotation 1985 or a negative blade rotation 1987.

In the example embodiment shown in FIG. 15, a negative handle rotation 1980 can result in a positive blade rotation 1985 and a positive handle rotation 1997 can result in a negative blade rotation 1987.

The trimmer angle 880 can be a positive, such as positive trimmer angle 882, or a negative trimmer angle, such as negative trimmer angle 886. In an example, the trimmer blade 560 can be rotated to a positive 45° trimmer angle 1882 of the trimmer blade 560. In another example, the trimmer blade 560 can be rotated to a perpendicular trimmer angle 1884. In yet another embodiment, the trimmer blade 560 can be rotated to a negative 45° trimmer angle 1886.

FIGS. 16A-16D show the trimmer blade 560 at the selection of the trimmer angle 880 shown in FIG. 15.

FIG. 16A shows the trimmer blade 560 configured at a perpendicular trimmer angle 1884, of positive 90° blade rotation FIG. 16B shows the trimmer blade 560 configured at a positive 45° trimmer angle 1882 of positive 45° blade rotation.

FIG. 16C shows the trimmer blade 560 configured at a 0° trimmer angle in which the trimmer blade centerline 1560 coplanar with the pole centerline axis 1200.

FIG. 16D shows the trimmer blade 560 configured at a negative 45° trimmer angle 1886, of negative 45° blade rotation.

FIG. 16E shows the trimmer blade configured at a negative 90° trimmer angle 1887, of negative 90° blade rotation.

Figure 17:
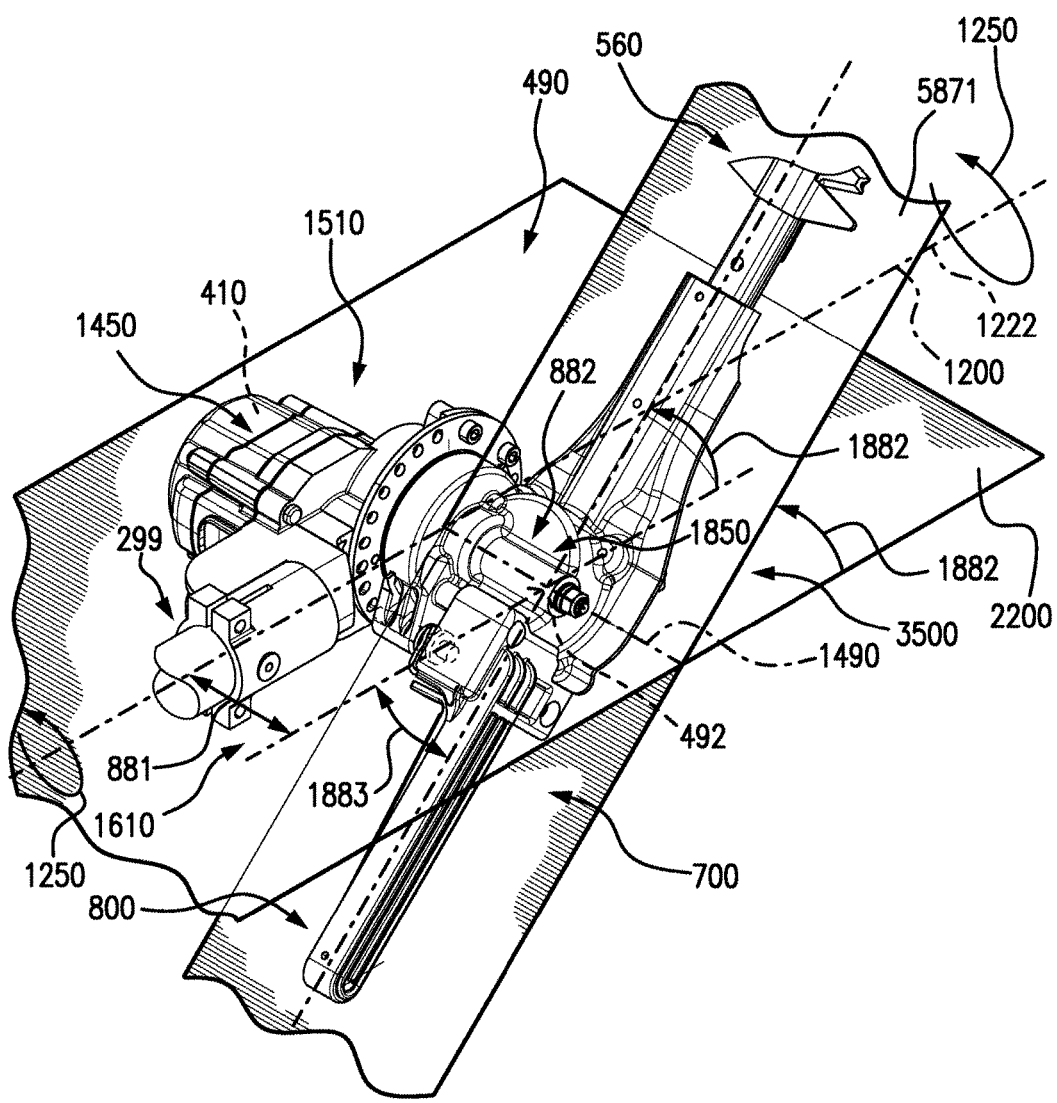
FIG. 17 is a perspective view of the trimmer blade configured at a positive 45° trimmer angle.

FIG. 17 is a perspective view of the trimmer blade 560 configured to have a trimming angle 3500 which is a positive 45° trimmer angle 1882, of positive 45° blade rotation. FIG. 17 shows the trim orientation plane 5871 intersecting with trimming plane 2200 at the positive 45° trimmer angle 1882.

In an embodiment, in which the pole hedge trimmer 10 with the motor 410 on one side and the trimmer head 822 on the opposite side of the balance plane, that is balanced so that there is no significant rotational moment about the pole centerline axis 1200 and/or the center of gravity axis 1222. In an embodiment, when the when said pole hedge trimmer 10 is rotated about the pole axis in any degree of rotation, the pole hedge trimmer 10 is balanced so that there is no significant rotational moment about the pole centerline axis 1200. In an embodiment, when the trimmer head 822 is at a trimming angle 3500 the pole hedge trimmer 10 is balanced so that there is no significant rotational moment about the pole centerline axis 1200 when the pole hedge trimmer 10 is rotated about the pole axis in any degree of rotation.

In an embodiment, the motor 410 is configured beyond the pole proximate to the trimmer unit 700 and when the when said pole hedge trimmer 10 is rotated about the pole axis in any degree of rotation, as shown by rotation motion arrow 1250, such as 45° or 90°, no significant rotational moment about the pole centerline axis 1200.

In an embodiment, the trimmer assembly can have a motor 410 is configured such that the motor side center of gravity 1450 of motor unit 400 and/or the motor 410 is balanced with and is configured opposite of the trimmer side center of gravity 1850. In an embodiment, the motor side center of gravity 1450 of motor unit 400 and/or the motor 410 is balanced with and is configured opposite of the trimmer side center of gravity 1850 and/or the trimmer head 822 and each of motor side center of gravity 1450 and the trimmer side center of gravity 1850 and is configured beyond the pole and/or pole end 299, as shown for non-limiting example in FIGS. 1, 3 and 17, and when the pole hedge trimmer 10 is rotated about the pole axis in any degree of rotation, such as 45° or 90°, no significant rotational moment about the pole centerline axis 1200 for any trimming angle 3500. In an embodiment one or both of the motor unit 400 and/or the motor 410 and the trimmer head 822 are in part or wholly configured beyond the pole and/or pole end 299, as shown for non-limiting example in FIGS. 1, 3 and 17, and when the pole hedge trimmer 10 is rotated about the pole axis in any degree of rotation, such as 45° or 90°, no significant rotational moment about the pole centerline axis 1200 for any trimming angle 3500.

In an embodiment, the trimmer assembly having a motor is configured such that the center of motor 410 and/or the trimmer head 822 is configured proximate to the end of the pole as shown, for non-limiting example in FIG. 3, and when the pole hedge trimmer 10 is rotated about the pole axis in any degree of rotation, such as 45° or 90°, no significant rotational moment about the pole centerline axis 1200 for any trimming angle 3500.

Figure 18:
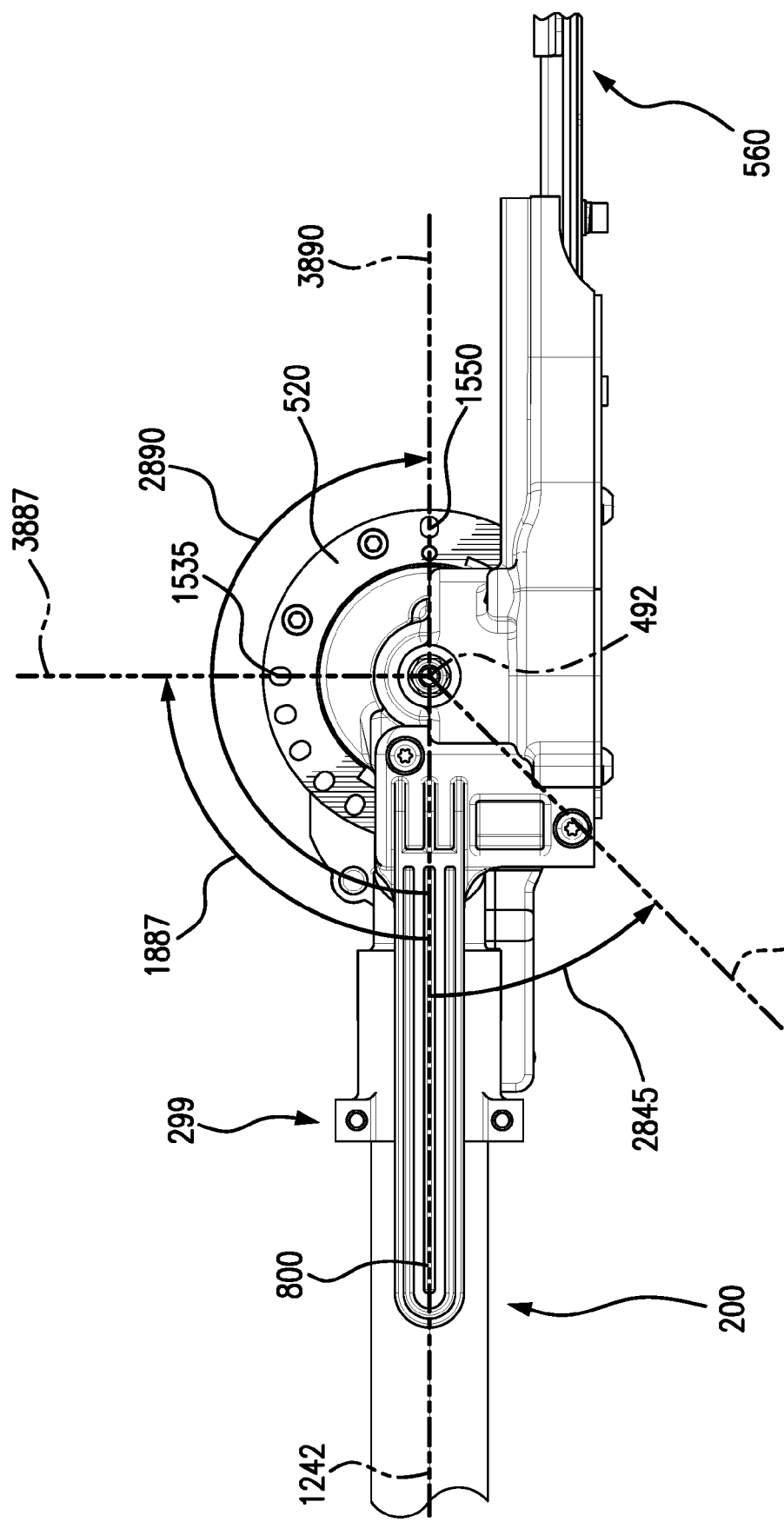
FIG. 18 shows examples of rotation positions for the trimmer head.

FIG. 18 shows examples of rotation positions for the trimmer head. FIG. 18 shows an example of rotation positions for the trimmer head. The example of FIG. 18 shows a Right side view of trimmer body 490 showing rotation positions of potential value in relation to orientation handle. FIG. 18 provides nonlimiting examples of the handle moved to perpendicular trimmer angle 1884, which in an embodiment can be a tallest flat cutting configuration for vegetation such as the top of tall hedges.

In a first example, the orientation handle 800 can be rotated to a positive 90° handle rotation angle 1887 to achieve a tall flat cutting position 3887. In a second example, the orientation handle 800 can be rotated to a positive 180° handle rotation angle 2890 to achieve a positive rotated closed position 3890. In a third example, the orientation handle 800 can be rotated to a negative 45° handle rotation angle 2845 to achieve an angled low cut position 3845.

Figure 19:
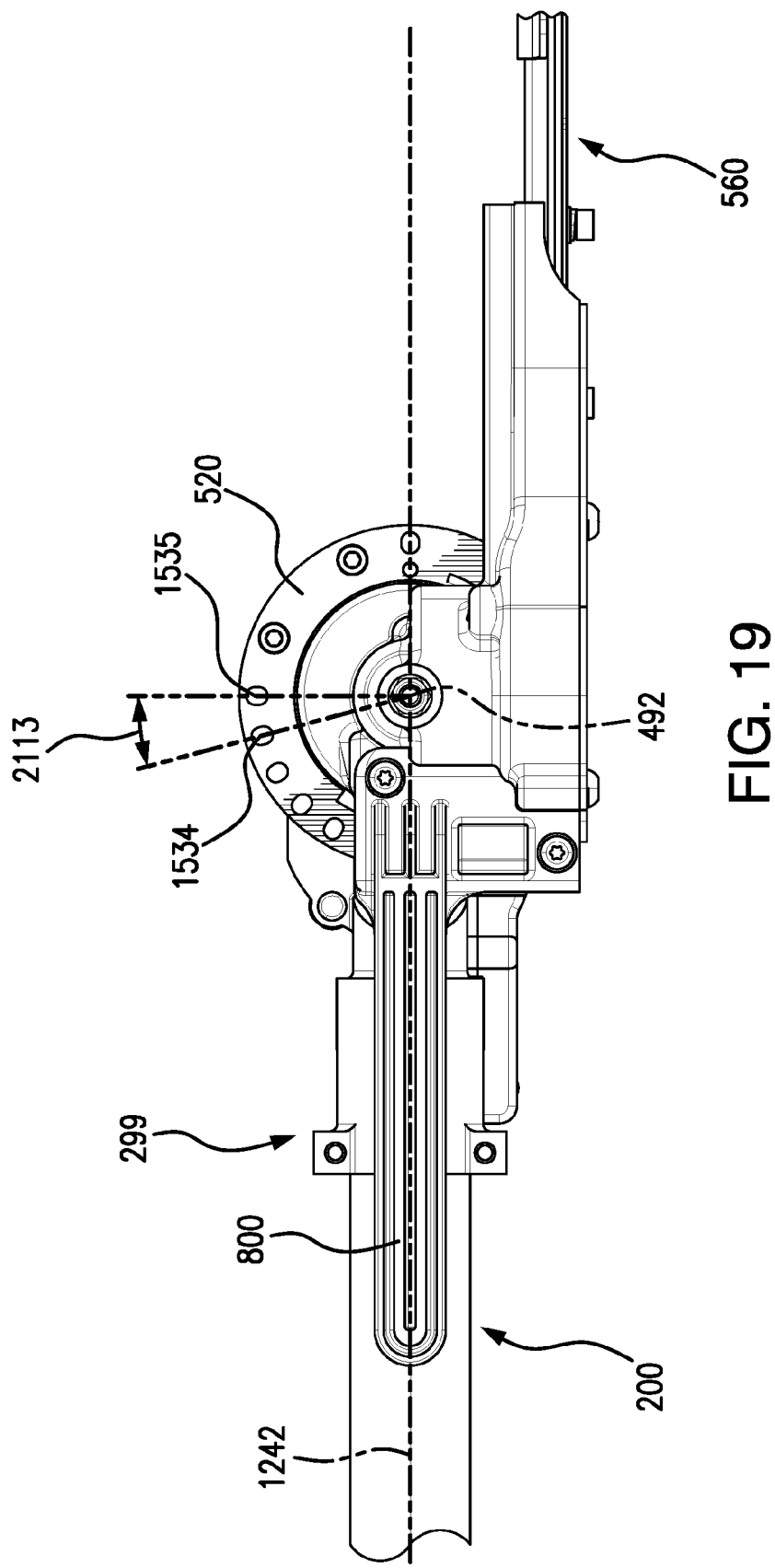
FIG. 19 shows examples of rotation increments of an orientation lock disk.

FIG. 19 shows examples of rotation increments of an orientation lock disk. The example of FIG. 19 shows a trimmer-side view of trimmer body 490 showing example rotation increments.

In the embodiment of FIG. 19, the orientation lock disc 520 has a number of the radial lock opening 530, such as for example the 4th radial lock opening 1534 and the 5th radial lock opening 1535 which are configured to have an example of the handle rotation increment 1915 of 15°.

Figure 20:
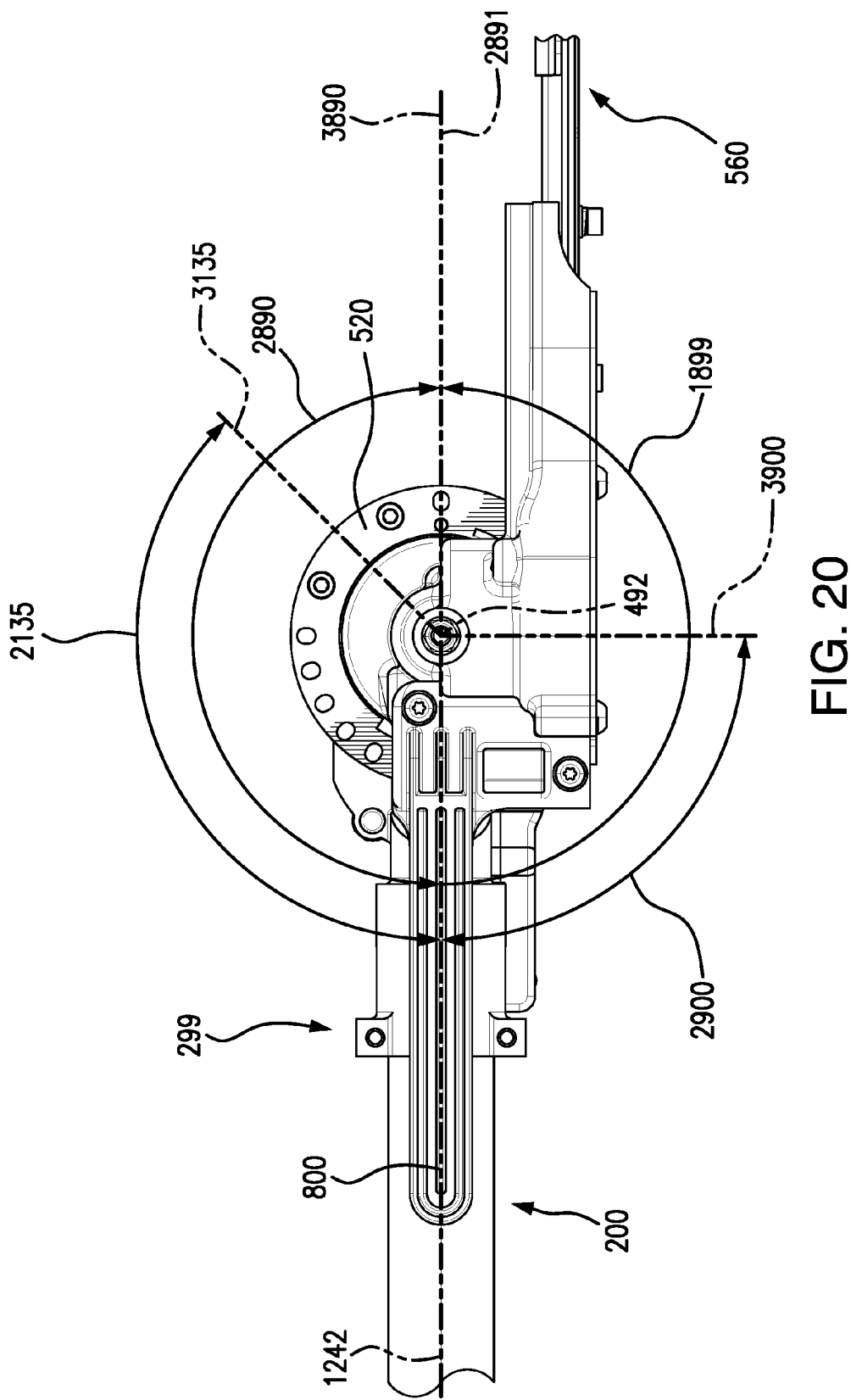
FIG. 20 shows example rotation angles of positions for the trimmer head.

FIG. 20 shows example rotation angles of positions for the trimmer head. The example of FIG. 20 shows a trimmer-side view of trimmer body 490 showing example rotation angles.

In a first example, the orientation handle 800 can be rotated to a positive 135° handle rotation angle 2135 to achieve a positive angle high cut position 3135. In a second example, the orientation handle 800 can be rotated to a positive 180° handle rotation angle 2980 to achieve a positive rotated closed position 3890. In a third example, the orientation handle 800 can be rotated to a negative 90° handle rotation angle 2900 to achieve a negative rotation closed position 2891. In a fourth example, the orientation handle 800 can be rotated to a negative 180° handle rotation angle 1890 to achieve a low flat cutting position 3900.

Figure 21:
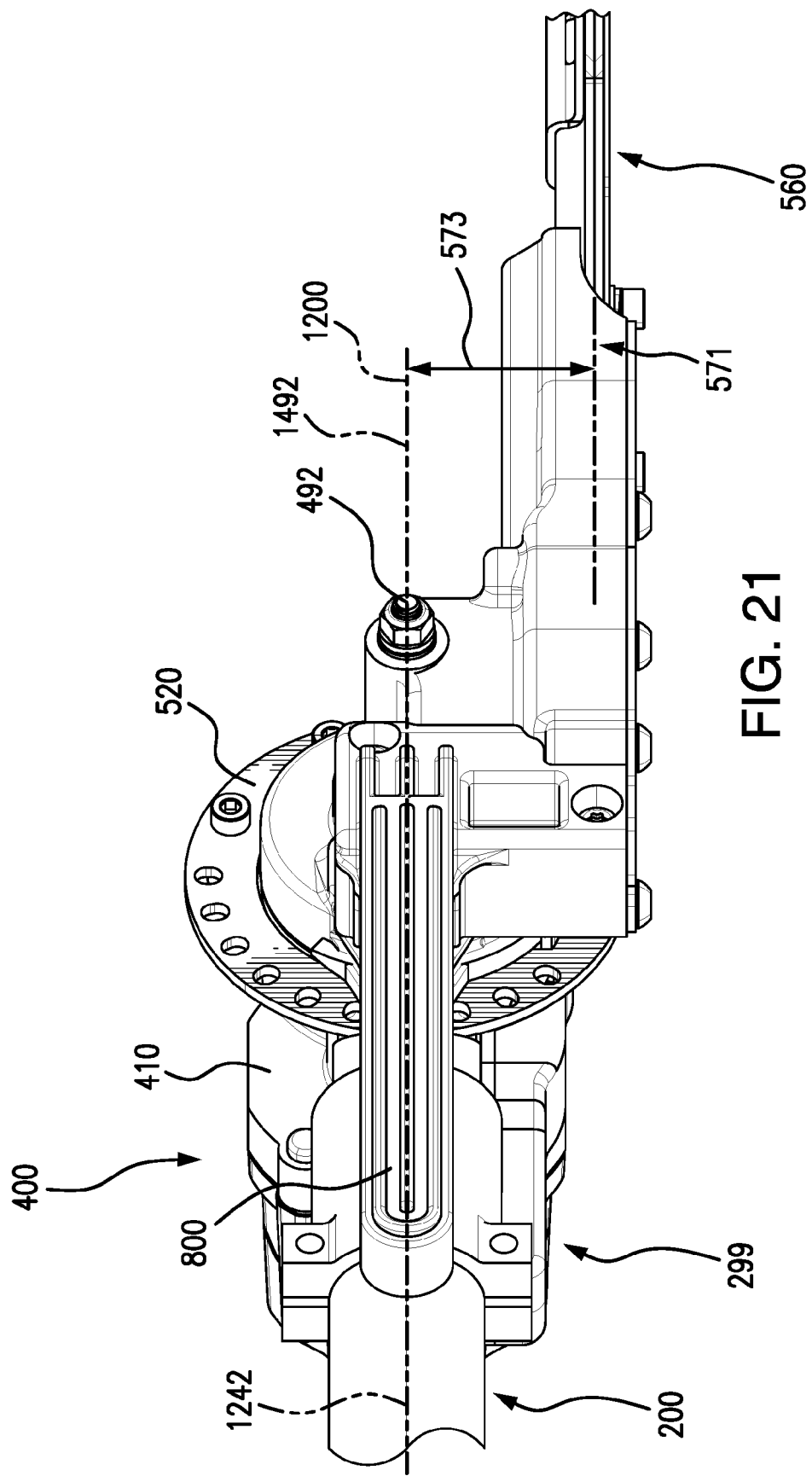
FIG. 21 shows an example of a blade interface distance.

FIG. 21 shows an example of a blade interface distance. The example of FIG. 21 shows a perspective view of trimmer body 490 showing an example of trimmer blade interface offset in the vertical direction, at the blade interface distance 573. In this example the blade interface 571 is shown at the blade interface distance 573 from the trimmer axle centerline 1490, which optionally can be coplanar with the pole centerline axis 1200 and/or the center of gravity axis 1222 and/or a handle face centerline 1242. In an embodiment, the blade interface distance 573 can be configured in the vertical plane and/or balance plane 1100 in a range of 0 mm to 60 mm away from the intersection of the pole centerline axis 1200 with the balance plane 1100, for example the blade interface distance 573 such as 40.6 mm vertically away (+Y,−Y) from the intersection of the pole centerline axis 1200 with the balance plane 1100.

Figure 22:
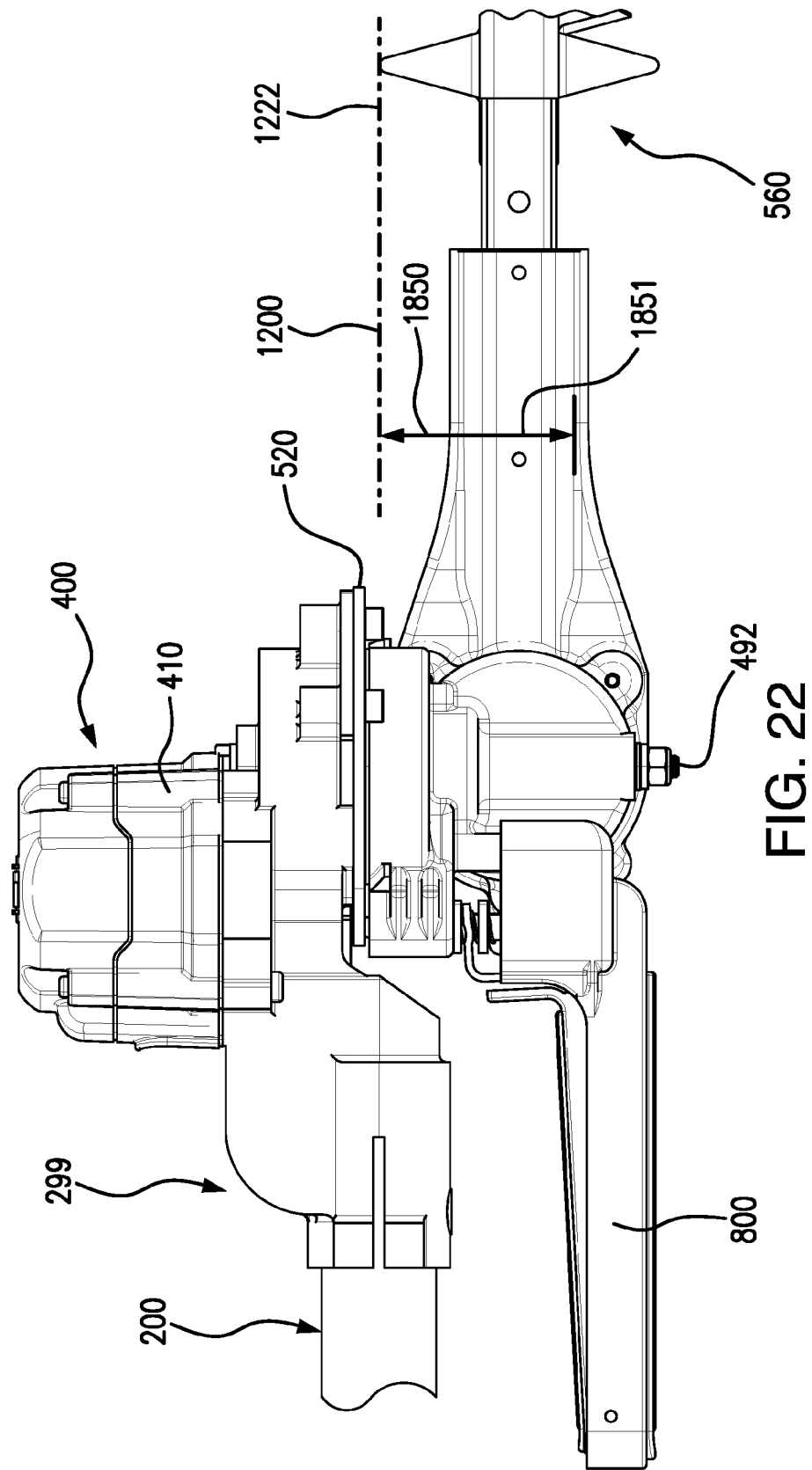
FIG. 22 shows an example of a first trimmer side center of gravity for a trimmer head measured in the +Z,−Z direction of FIG. 2.

FIG. 22 shows an example of a first trimmer side center of gravity for a trimmer head measured in the +Z,−Z direction of FIG. 2. The example of FIG. 22 shows a top view and right side view of trimmer body 490 showing center of gravity example in horizontal and vertical directions. FIG. 22 shows an example embodiment can have a trimmer side center of gravity 1850, such as a trimmer side center of gravity on the trimmer plane 1851, which for nonlimiting example can be in a range of 0 to 50 mm such as 5 mm, 6 mm, 7.5 mm, or 10 mm.

Figure 23:
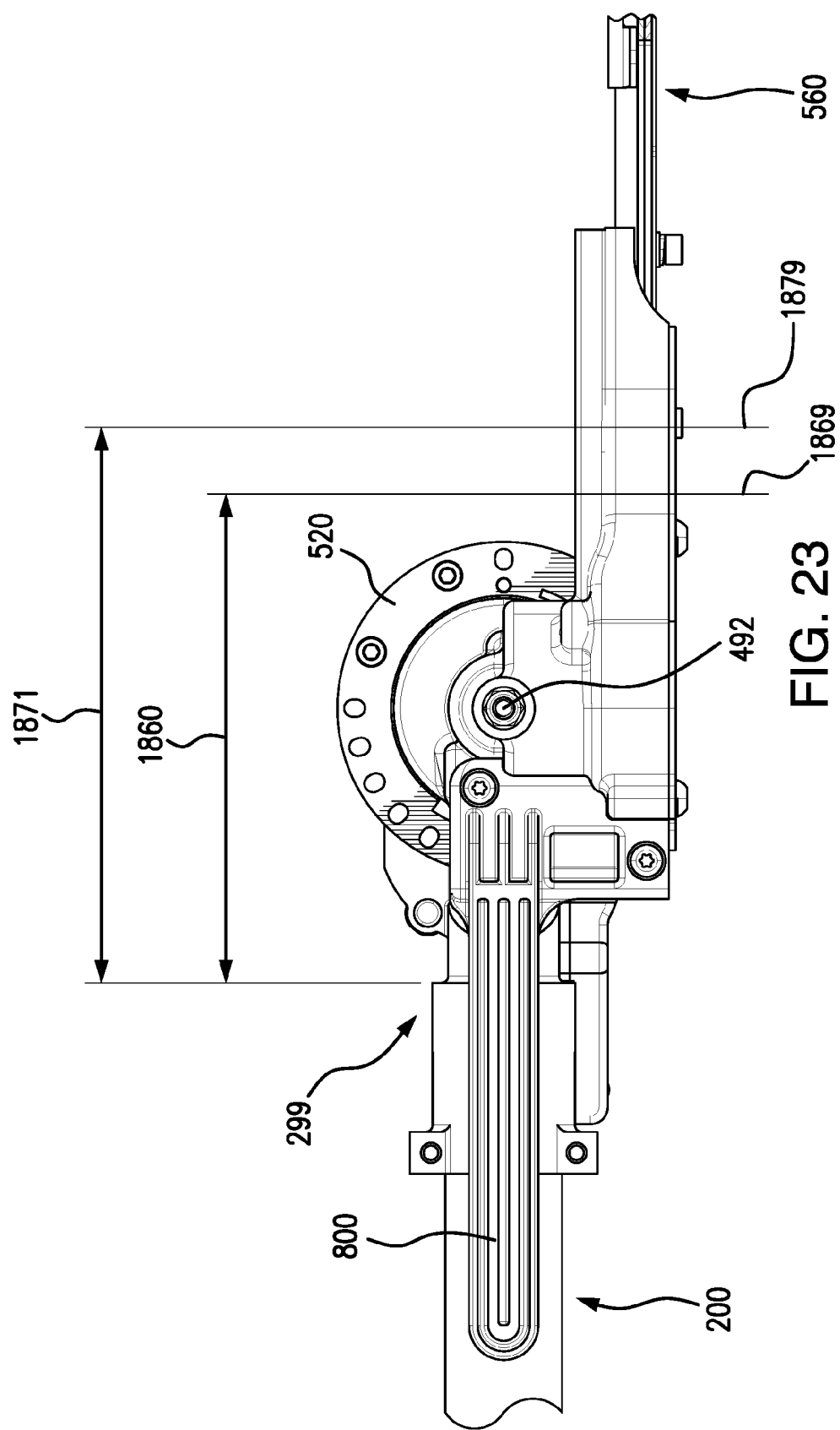
FIG. 23 shows an example of a second trimmer side center of gravity for a trimmer head measured in the +X,−X direction of FIG. 2.

FIG. 23 shows a trimmer assembly center of gravity 1869 can be beyond the pole end 299 by a distance 1860 in a range of 5 mm to 100 mm, such as 10 mm, 20 mm, 30 mm, 40 mm, or greater. In an embodiment, a trimmer head center of gravity 1879 can be beyond the pole end 299 by a distance 1871 in a range of 5 mm to 100 mm, such as 10 mm, 20 mm, 30 mm, 40 mm, or greater.

In an embodiment, the trimmer assembly 490 can have the trimmer assembly center of gravity 1869 and the trimmer blade can have a blade tip 599. The trimmer assembly center of gravity 1869 can be configured between a pole end 299 and the blade tip 599 when the trimmer blade 566 is in an open and/or operational and/or trimming and/or cutting configuration when the trimmer assembly 490 is not in a closed state. For nonlimitng example, the an open and/or operational and/or trimming and/or cutting configuration when the orientation handle 800 is in any of a range of positions from positive 90° to negative 90°.

FIG. 24 shows the trimmer blade in a folded position in which the orientation handle 800 has been rotated to a negative 180° handle rotation angle 2890 to achieve a negative rotated closed position 3897.

In an embodiment, the trimmer axle 492 to power trigger 150 distance of the pole hedge trimmer 10 when the blade 560 is at 180° extended position with the pole can be approximately 51 in. In another embodiment, the trimmer axle 492 to power trigger 150 distance of the pole hedge trimmer 10 when the blade 560 is in a closed position overlapping the pole can be approximately 51 in.

Figure 25:
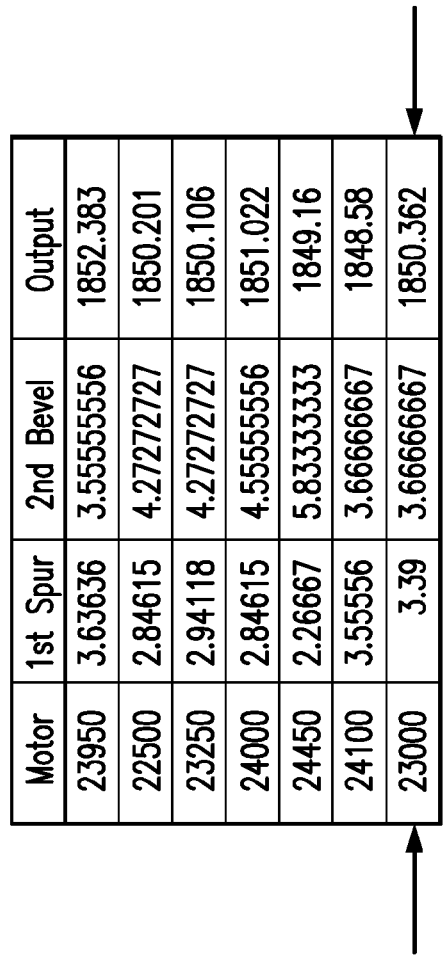
FIG. 25 shows an example of gear ratios.

FIG. 25 shows an example of gear ratios, as well as example motor and blade speeds. FIG. 25 provides non-limiting examples of gear ratios combinations which in in accordance with the data of FIG. 25, in various embodiments, can achieve a 12.43:1 gear reduction and example table of motor speeds and final output speeds with each reduction. Other ratios of gear reduction in a range of from 5:1 to 50:1 can optionally be used, such as 8:1, 10:1, 15:1 and 20:1.

In an embodiment, a hedge trimmer, can have: a power unit which is adapted to power a trimmer assembly; a pole which connects the power unit and the trimmer assembly; the hedge trimmer having a balance plane 1100 between a motor side and a trimmer side; the trimmer assembly having a motor unit configured on the motor side; the trimmer assembly having a trimmer unit configured on the trimmer side; the hedge trimmer having a motor-side weight and a trimmer-side weight; and the motor-side weight substantially balanced with the trimmer-side weight.

The hedge trimmer can further have a motor-side center of gravity and a trimmer-side center of gravity which are configured to substantially balance the hedge trimmer between the motor side and the trimmer side of the balance plane 1100. The trimmer assembly can have a trimmer handle on the trimmer-side of the balance plane 1100. The trimmer assembly can have a trimmer head at least in part configured on the trimmer-side of the balance plane 1100. The trimmer assembly can have a trimmer blade configured on the trimmer-side of the balance plane 1100.

The trimmer assembly can have a trimmer head having a trimmer handle which can be used by an operator to orient the trimmer blade to achieve a trimmer angle. The trimmer assembly can have a trimmer blade configured on the trimmer-side of the balance plane 1100 such that the trimmer blade is free of intersection with the balance plane 1100 at any trimmer angle.

The trimmer assembly can have a 1st gear reduction on the motor-side of the balance plane 1100 and a 2nd gear reduction configured on the trimmer side of the balance plane 1100. The trimmer assembly can have a trimmer head having an eccentric configured on the trimmer side of the balance plane 1100.

In an embodiment, the hedge trimmer can have a motor which provides power to drive at least one of a trimmer blade; the motor and the trimmer blade located on opposing sides of a balance plane 1100, and the motor configured such that a direction of a motor torque does not intersect the balance plane 1100. The motor can be configured such that a direction of the motor torque can be parallel to the balance plane 1100. The motor can be configured such that a direction of the motor torque can be perpendicular to a trimmer axle.

The hedge trimmer can have an eccentric that drives at least one trimmer blade, and the motor and the eccentric configured on opposing sides of the balance plane 1100.

The hedge trimmer can have a trim angle plane 3300 free of a motor torque coplanar with the trim angle plane 3300. The hedge trimmer can have a trim angle plane 3300 experiencing a trimmer rotational moment coplanar to the trim angle plane which is less than 10 lbf. The hedge can have a trim angle plane experiencing a trimmer rotational moment coplanar to the trim angle plane 3300 which is less than 2 lbf. The trim angle plane 3300 can be free of a motor torque coplanar with the trim angle plane 3300.

The motor can have a rotor axis which is at an angle which is not perpendicular to the trim angle plane 3300. The motor can have a rotor axis which is parallel to the trim angle plane 3300. The motor can have a rotor axis and the hedge trimmer can have a trimmer head having an eccentric which imparts power to the at least one of a trimmer blade; the eccentric having an eccentric axis which is not parallel to the rotor axis. The motor can have a rotor axis and the hedge trimmer can have a trimmer head having an eccentric which imparts power to the at least one of a trimmer blade; the eccentric having an eccentric axis which is perpendicular to the rotor axis.

In an embodiment, the hedge trimmer, can have a motor unit, a trimmer head having at least one trimmer blade, and a position system for reversibly orienting at least one trimmer blade relative to a horizontal trim angle plane 3300; the motor unit configured on a motor side of a balance plane 1100 and the at least one trimmer blade configured on a trimmer side of a balance plane 1100; the position system having a locked state and an unlocked state; when in the unlocked state the position system allows the at least one trimmer blade to move to an orientation having a trimming angle; when in the locked state the position system reversibly fixes the trimmer blade at the trimming angle.

The position system can have an actuator which can change the state of the position system reversibly from a locked state to an unlocked state. The position system can have an actuator located at least in part on the trimmer side of the balance plane 1100, the actuator adapted to change the state of the position system reversibly from a locked state to an unlocked state. The position system can have an actuator located at least in part on the motor side of the balance plane 1100, the actuator adapted to change the state of the position system reversibly from a locked state to an unlocked state The position system can have a grip having at least a portion located on the trimmer side of the balance plane 1100 which, when the position system is in an unlocked state, can move the at least one trimmer blade to a trimming angle. The position system can have a handle having at least a portion located on the trimmer side of the balance plane 1100 which, when the position system is in an unlocked state, can move the at least one trimmer blade to a trimming angle.

The position system can have a handle having at least a portion located on the motor side of the balance plane 1100 which, when the position system is in an unlocked state, can move the at least one trimmer blade to a trimming angle. The position system can have a handle having at least a portion located on the motor side of the balance plane 1100 and at least a part on the trimmer side which, when the position system is in an unlocked state, can move the at least one trimmer blade to a trimming angle.

The position system further can have a knob having at least a portion located on the trimmer side of the balance plane 1100 which, when the position system is in an unlocked state, can move the at least one trimmer blade to a trimming angle.

The at least one trimmer blade can be moved by moving a handle which is at least in part located on the trimming side of the balance plane 1100 when the position system is in an unlocked state.

In an embodiment, the trimmer blade position system can have: the trimmer blade position system having a means for reversibly fixing the position of a trimmer blade; the means for reversibly fixing the position configured at least in part on a motor side of the balance plane 1100; and the trimmer blade configured at least in part on a trimmer side of a balance plane 1100; the means being operable by one-hand.

In an embodiment, the trimmer blade position system can at least in part intersect the balance plane 1100. Optionally, the means for reversibly fixing the position of the trimmer blade can have a lock pin which can reversibly engage a lock opening. Optionally, the means for reversibly fixing the position of the trimmer blade can have a lock-and-key mechanism. Optionally, the means for reversibly fixing the position of the trimmer blade can have a friction lock mechanism.

In an embodiment, the means for reversibly fixing the position of the trimmer blade can have an orientation lock pin which can reversibly engage a lock opening of an orientation lock disk. Optionally, the means for reversibly fixing the position of the trimmer blade can have a handle having a trigger which can reversibly engage and disengage an orientation lock pin with a lock opening of an orientation lock disk.

In an embodiment, the trimmer blade position system can have a trimmer axle centerline which is collinear with and intermediate shaft axis.

In an embodiment, the trimmer blade position system can have an intermediate shaft which intersects the balance plane 1100.

Optionally, the trimmer blade position system can have a safety switch at least a portion of which is configured on the trimmer side. Optionally, the trimmer blade position system of claim can have a safety switch at least a portion of which intersects the balance plane 1100. Optionally, the trimmer blade position system of claim can have a safety switch at least a portion of which is configured on the motor side. Optionally, the trimmer blade position system can have a safety switch which is configured on the motor side.

In an embodiment, a trimmer blade position system the trimmer blade configured on a trimmer side of a balance plane 1100; and a motor unit configured on a motor side of a balance plane 1100. In an embodiment, the trimmer blade can be configured on a trimmer side of a balance plane 1100; and the trimmer blade position system and a motor unit configured on a motor side of a balance plane 1100. In an embodiment, the trimmer blade can be configured on a trimmer side of a balance plane 1100; and a motor unit and at least a part of the trimmer blade position system configured on a motor side of a balance plane 1100.

In an embodiment, a low-profile hedge trimmer can have a power unit, a trimmer assembly and a pole having a pole centerline. The low-profile hedge trimmer can be substantially balanced radially about the pole centerline.

In an embodiment, the low-profile hedge trimmer can have a motor unit which does not intersect the pole centerline. In another embodiment, the low-profile hedge trimmer can have a trimmer unit which does not intersect the pole centerline. In yet another embodiment, the low-profile hedge trimmer can have a motor unit which does not intersect the pole centerline; and further comprising a trimmer unit which does not intersect the pole centerline.

In an embodiment, the low-profile hedge trimmer, further comprising a trimmer blade position system which does not intersect the pole centerline. In an embodiment, the low-profile hedge trimmer, further comprising a center of gravity axis which is collinear with the pole centerline.

In an embodiment, the low-profile hedge trimmer, further comprising a center of gravity axis which is parallel the pole centerline. In an embodiment, the low-profile hedge trimmer, further comprising a center of gravity axis which does not intersect the motor unit or the trimmer unit.

In an embodiment, a hedge trimmer can have a trimmer head having a blade having a lower face which has a lower face distance from the axle centerline of 60 mm or less. In an embodiment, a hedge trimmer can have a trimmer head having a blade having a lower face which has a lower face distance from the pole centerline axis of 60 mm or less. In an embodiment, a hedge trimmer can have a trimmer head having a blade having a lower face which has a lower face distance from the center of gravity axis of 60 mm or less. In an embodiment, a hedge trimmer can have a trimmer head having a blade interface at a blade interface distance 573 from the axle centerline of 50 mm or less. In an embodiment, a hedge trimmer can have a trimmer head having a blade interface at a blade interface distance from the pole centerline axis of 50 mm or less. In an embodiment, a hedge trimmer can have a trimmer head having a blade interface at a blade interface distance from the center of gravity axis of 50 mm, or less, e.g. 40 mm.

In an embodiment, a hedge trimmer can have a trimmer head having a lower blade face clearance 575 of 7.5 mm or less, or 5 mm or less. In an embodiment, a hedge trimmer can have a trimmer head having a center of gravity of 20 mm or less from the pole centerline axis 1200.

In an embodiment, a hedge trimmer can have a trimmer head having a center of gravity of 15 mm, or 10 mm or less, or 8 mm or less from the pole centerline axis. In an embodiment, a hedge trimmer can have a trimmer head having a center of gravity of 15 mm or less, or 10 mm or less, or 8 mm or less from the center of gravity axis 1222.

This disclosure regards a power tool and its many aspects, features and elements. Such an apparatus can be dynamic in its use and operation. This disclosure is intended to encompass the equivalents, means, systems and methods of the use of the hedge trimmer and its many aspects consistent with the description and spirit of the apparatus, means, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose equivalents, means, systems and methods to achieve the devices, designs, operations, control systems, controls, activities, mechanical actions, dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be appreciated that various modifications and changes can be made to the above described embodiments of the power tool as disclosed herein without departing from the spirit and the scope of the claims.

We claim:

1. A power tool, comprising:
a main body housing comprising a power unit configured at a distance from a trimmer assembly by a support member;
said trimmer assembly having a motor unit powered by said power unit and configured to drive a trimmer unit having a trimmer axle about which a trimmer head having at least one of a trimmer blade can be rotated by an operator to configure said at least one trimmer blade at a desired trimmer angle; and said motor unit and said trimmer unit are located on opposing sides of said support member and are generally in balance with one another about a support member axis.

2. The power tool according to claim 1, wherein said motor unit has a motor which provides power to drive at least one of said trimmer blade; and
said motor and said trimmer blade are located on opposing sides of the support member axis.

3. The power tool according to claim 1, wherein the motor unit and trimmer unit are configured generally in balance and do not impart a rotational moment to the power tool about the support member axis.

4. The power tool according to claim 1, wherein the motor unit has
a motor that generates a motor torque, and
wherein said motor is configured such that the direction of the motor torque does not impart a torque about the support member axis.

5. The power tool according to claim 1, wherein the trimmer head has a trimmer axle and said motor generates a motor torque, and
wherein said motor is configured such that a direction of said motor torque is perpendicular to a trimmer axle centerline.

6. The power tool according to claim 1, wherein said trimmer assembly has a trimmer assembly center of gravity and said trimmer blade has a blade tip; and
wherein said trimmer assembly center of gravity is configured between a support member end and said blade tip when said trimmer blade is oriented in a configuration for a trimming operation.

7. The power tool according to claim 1, wherein the power tool is a hedge trimmer.

8. A hedge trimmer, comprising:
a power unit powering a motor unit of a trimmer assembly;
said trimmer assembly having a trimmer unit having a trimmer head having at least one trimmer blade driven by said motor;
said trimmer assembly having a position system for orienting said at least one trimmer blade to a trimmer angle;
said position system having an orientation handle adapted for one-hand operation to move and lock said trimmer head;
said position system having a locked state and an unlocked state:
when in said unlocked state said position system allows said at least one trimmer blade to move to an orientation having a trimming angle:
when in said locked state said position system fixes the trimmer blade at said trimming angle; and
wherein said orientation handle comprises an orientation handle trigger which when triggered by a force of one hand of an operator achieves the unlocked state of the position system allowing said at least one trimmer blade to move to an orientation having a trimming angle by the motion of said one hand of an operation upon said orientation handle.

9. The hedge trimmer according to claim 8, wherein said trimmer head is rotatably mounted on a trimmer axle and said orientation handle is configured to rotate said trimmer head about said axle by the motion of one hand of an operator when the position system is in said unlocked state.

10. The power tool according to claim 8, wherein said position system comprises an orientation lock disk configured between said motor unit and said trimmer unit.

11. The hedge trimmer according to claim 8, further comprising:
a support member supporting said trimmer assembly at a distance from said power unit;
said support member having a support member axis; and
wherein said motor unit and said trimmer unit are located on opposing sides of said support member axis and are generally in balance with one another about said support member axis.

12. The hedge trimmer according to claim 8, further comprising:
a support member supporting said trimmer assembly at a distance from said power unit;
said support member having a support member axis;
wherein said motor drives an eccentric which drives at least one trimmer blade; and
wherein said motor and said eccentric are configured on opposing sides of an axis of the support member.

13. The hedge trimmer according to claim 8, wherein the motor has a rotor axis which is parallel to a trim plane of the at least one trimmer blade.

14. The hedge trimmer according to claim 8, wherein the motor has a rotor axis and the hedge trimmer has a trimmer head having an eccentric which imparts power to said at least one trimmer blade; and
wherein said eccentric has an eccentric axis which is not parallel to the rotor axis.

15. The trimmer blade position system of claim 8, wherein said orientation handle is configured to engage and disengage an orientation lock pin with a lock opening of an orientation lock disk.

16. A low-profile hedge trimmer, comprising:
a power unit configured at a distance from a trimmer assembly by a support member;
said trimmer assembly having a trimmer axle about which a trimmer head having at least one of a trimmer blade can be rotated by an operator to configure said at least one trimmer blade at a desired trimmer angle;
said trimmer axle having an axle centerline; and
said trimmer blade having a lower face which has a lower face distance from the axle centerline of 60 mm or less.

17. The low-profile hedge trimmer according to claim 16, further comprising:
a first trimmer blade and a second trimmer blade having a blade interface between them; and said blade interface distance from said axle centerline of 50 mm or less.

18. The low-profile hedge trimmer according to claim 16, wherein said trimmer blade has a lower blade face clearance of 7.5 mm or less.

19. The low-profile hedge trimmer according to claim 16, wherein the support member is a pole and the trimmer head has a center of gravity of 20 mm or less from a pole centerline axis.

* * * * *